US010518171B2

United States Patent
Akifusa et al.

(10) Patent No.: US 10,518,171 B2
(45) Date of Patent: Dec. 31, 2019

(54) GAME SYSTEM, GAME APPARATUS, STORAGE MEDIUM HAVING GAME PROGRAM STORED THEREON, OPERATION DETERMINATION METHOD, AND INFORMATION PROCESSING APPARATUS

(71) Applicant: NINTENDO CO., LTD., Kyoto (JP)

(72) Inventors: Yusuke Akifusa, Kyoto (JP); Ryo Kataoka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 237 days.

(21) Appl. No.: 15/597,533

(22) Filed: May 17, 2017

(65) Prior Publication Data

US 2017/0354865 A1  Dec. 14, 2017

(30) Foreign Application Priority Data

Jun. 8, 2016 (JP) ................................ 2016-114288

(51) Int. Cl.
*A63F 13/219* (2014.01)
*A63F 13/211* (2014.01)
*A63F 13/235* (2014.01)
*A63F 13/25* (2014.01)
*A63F 13/837* (2014.01)
*A63F 13/92* (2014.01)

(52) U.S. Cl.
CPC .......... *A63F 13/219* (2014.09); *A63F 13/211* (2014.09); *A63F 13/235* (2014.09); *A63F 13/25* (2014.09); *A63F 13/837* (2014.09); *A63F 13/92* (2014.09)

(58) Field of Classification Search
CPC .................. A63F 13/211; A63F 13/428; A63F 2300/105; A63F 13/22; A63F 13/219
See application file for complete search history.

(56) References Cited

U.S. PATENT DOCUMENTS

| | | | |
|---|---|---|---|
| 2011/0287842 A1 | 11/2011 | Yamada et al. | |
| 2012/0165099 A1* | 6/2012 | Ito | A63F 13/211 463/37 |
| 2012/0229516 A1* | 9/2012 | Matsunaga | A63F 13/26 345/659 |
| 2012/0299813 A1* | 11/2012 | Kang | G06F 1/1641 345/156 |
| 2013/0314399 A1* | 11/2013 | Abe | G06F 3/0346 345/419 |

FOREIGN PATENT DOCUMENTS

JP  2011-239985  12/2011

* cited by examiner

*Primary Examiner* — David Duffy
*Assistant Examiner* — Ankit B Doshi
(74) *Attorney, Agent, or Firm* — Nixon & Vanderhye PC

(57) ABSTRACT

In a case where an attitude is included in a predetermined first range at a timing when a predetermined instruction operation is made by use of an input device, an instruction operation is determined to be successful. In a case where the attitude is included in a second range outside the first range at the timing of the instruction operation, it is further determined that the instruction operation is successful in a case where within a predetermined time period after the timing, the attitude is included in the first range or a third range including at least a part of the first range, and further the operation device is put into a still state or a state of moving by a predetermined amount or less.

16 Claims, 17 Drawing Sheets

F I G. 8
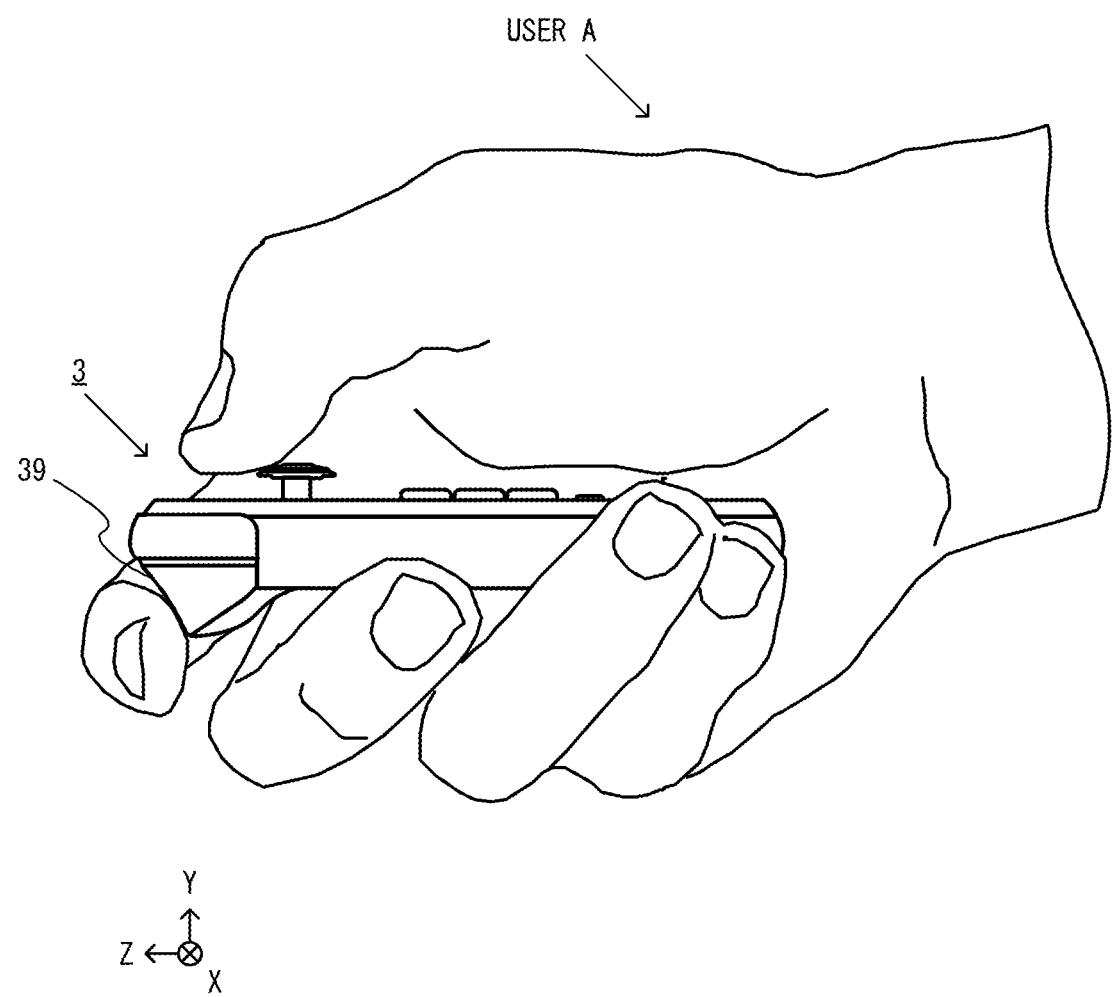

USER A  USER B

F I G. 15
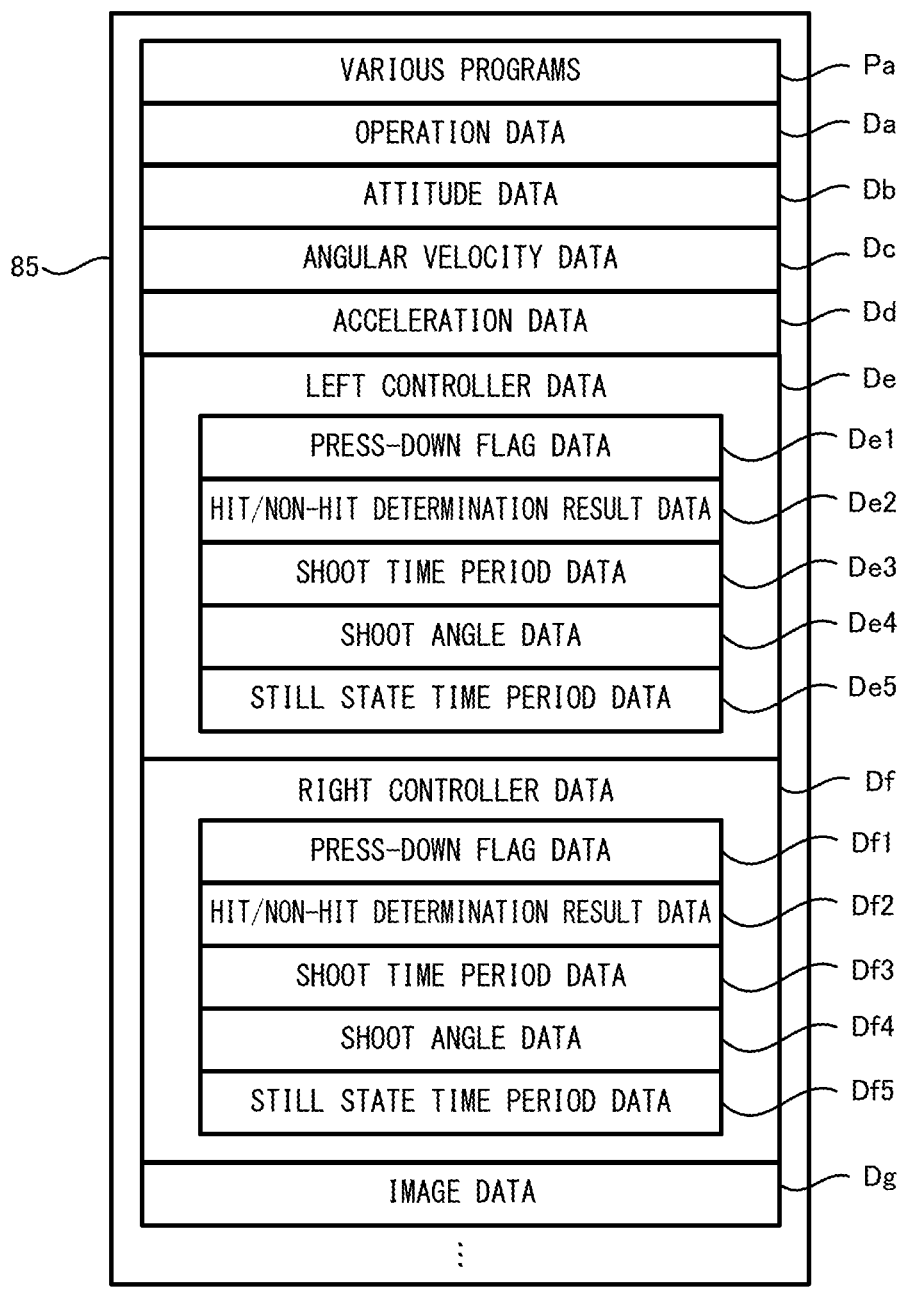

GAME SYSTEM, GAME APPARATUS, STORAGE MEDIUM HAVING GAME PROGRAM STORED THEREON, OPERATION DETERMINATION METHOD, AND INFORMATION PROCESSING APPARATUS

CROSS REFERENCE TO RELATED APPLICATION

The disclosure of Japanese Patent Application No. 2016-114288 filed on Jun. 8, 2016 is incorporated herein by reference.

FIELD

The technology shown herein relates to a game system operable by use of at least an attitude and/or a motion of an operation device, a game apparatus, a storage medium having the game program stored thereon, an operation determination method, and an information processing apparatus

BACKGROUND AND SUMMARY

Conventionally, there is a game device performing a game operation in accordance with an orientation of an input device. For example, such a game apparatus acquires angular velocity data and operation data indicating whether or not a predetermined button has been pressed from an input device including a built-in gyrosensor. The acquired angular velocity data is used to calculate an attitude of the input device. In a case where the predetermined button has been pressed, a game is performed in which a virtual object (e.g., arrow) is shot in a direction in accordance with the calculated attitude.

However, in the game as described above in which the direction is determined based on the attitude of the input device and the virtual object is shot by a button operation, if an operation of quickly determining the shooting direction to shoot the virtual object is requested, the button may be pressed prematurely.

Therefore, it is an object of an exemplary embodiment to provide a game system, a game apparatus, a storage medium having a game program stored thereon, an operation determination method, and an information processing apparatus by which an instruction operation performed in combination with an attitude and/or a motion of an input device is allowed to be made easily.

In order to achieve the above-described object, the exemplary embodiment may employ, for example, the following configurations. It is understood that, in order to interpret the claims, the scope of the claims should be interpreted only by the recitations of the claims. If there is a contradiction between the recitations of the claims and the descriptions of the specification, the recitations of the claims take precedence.

An example of game system according to the exemplary embodiment includes a computer configured to perform an attitude calculation of calculating an attitude of at least one operation device; make a success determination that, in a case where the attitude is included in a predetermined first range at a timing when a predetermined instruction operation is made by use of the input device, the instruction operation is successful; and execute a game process based on a determination result of the success determination. In the success determination, the computer is further configured to, in a case where the attitude is included in a second range outside the first range at the timing of the instruction operation, further determine that the instruction operation is successful in a case where within a predetermined time period after the timing, the attitude is included in the first range or a third range including at least a part of the first range, and further the operation device is put into a still state or a state of moving by a predetermined amount or less.

According to the above, an instruction operation made in combination with the attitude of the operation device is allowed to be made easily.

In the successful determination, the computer may be configured to, as the instruction operation, operate a predetermined button included in the operation device.

According to the above, even an instruction operation made by a button operation, which may be made at a premature timing unintentionally, is allowed to be made easily.

In the attitude calculation, the computer may be configured to calculate the attitude of each of a plurality of operation devices. In the game process, the computer may be configured to start a game from a state where the attitude of each of the operation devices is included in a fourth range outside the first range, and then to determine, in the success determination, which of the operation devices made an instruction operation that succeeded at an earliest timing.

According to the above, an operation, in a game in which a plurality of users compete against each other on the quickness of making an instruction operation, is allowed to be made easily.

In a state where the attitude of the operation device is included in the second range or the fourth range, a forward direction of the operation device may be on the side of a depression angle with respect to the forward direction in a state where the attitude of the operation device is included in the first range.

According to the above, an operation, in a game in which an instruction operation is made in a state where the operation device is at a predetermined attitude after being swung up, is allowed to be made easily.

The game system may include the plurality of operation devices; and a main body apparatus. The main body apparatus allows each of the plurality of operation devices to be attached thereto, and detached therefrom. The plurality of operation devices may be each communicable with the main body apparatus wirelessly. The main body apparatus may include a display screen. In the game process, the computer may be configured to execute display control. In the display control, the computer may be configured to display a result of the game process on the display screen.

According to the above, in a game system in which the plurality of operation devices are each communicated with the main body apparatus wirelessly and a game image is displayed on the main body apparatus, an instruction operation made in combination with the attitude of each of the plurality of operation devices is allowed to be made easily.

The operation device may include a gyrosensor. In the attitude calculation, the computer may be configured to calculate the attitude of the operation device based on at least an angular velocity detected by the gyrosensor.

According to the above, the attitude of the operation device is calculated easily based on the angular velocity caused in the operation device.

The operation device may include an acceleration sensor. In the attitude calculation, the computer may be configured to calculate the attitude of the operation device based on at least an acceleration detected by the acceleration sensor.

According to the above, the attitude of the operation device is calculated easily based on the acceleration caused in the operation device.

The exemplary embodiment may be carried out in the form of a game apparatus or a storage medium having a game program stored thereon.

An example of operation determination method according to the exemplary embodiment executes a process of making a determination on an operation made by use of at least one operation device. The operation determination method includes performing an attitude calculation of calculating an attitude of the operation device; and making a success determination that, in a case where the attitude is included in a predetermined first range at a timing when a predetermined instruction operation is made by use of the input device, the instruction operation is successful. Making the success determination includes in a case where the attitude is included in a second range outside the first range at the timing of the instruction operation, determining that the instruction operation is successful in a case where within a predetermined time period after the timing, the attitude is included in the first range or a third range including at least a part of the first range, and further the operation device is put into a still state or a state of moving by a predetermined amount or less.

According to the above, an instruction operation made in combination with the attitude of the operation device is allowed to be made easily.

An example of information processing apparatus according to the exemplary embodiment performs an information process based on an operation made by use of at least one operation device. The information processing apparatus includes a computer configured to calculate a parameter controllable by moving the operation device; and in a case where the parameter is included in a first range at a timing when a predetermined instruction operation is made by use of the input device, execute an information process based on the first range. In the information process, the computer is further configured to, in a case where the parameter is included in a second range outside the first range at the timing of the instruction operation, further execute the information process based on the first range in a case where within a predetermined time period after the timing, the parameter is included in the first range or a third range including at least a part of the first range, and further the operation device is put into a still state or a state of moving by a predetermined amount or less.

According to the above, an instruction operation made in combination with the parameter controllable by the movement of the operation device is allowed to be made easily.

According to the exemplary embodiment, an instruction operation made in combination with an attitude and/or a motion of an input device is allowed to be made easily.

These and other objects, features, aspects and advantages of the exemplary embodiment will become more apparent from the following detailed description when taken in conjunction with the accompanying drawings.

BRIEF DESCRIPTION OF THE DRAWINGS

FIG. 8 shows a non-limiting example of how user A uses the information processing system 1 while holding a left controller 3 in a state where the left controller 3 is detached from the main body apparatus 2;

FIG. 15 shows a non-limiting example of data region set for a DRAM 85 in the main body apparatus 2 in the exemplary embodiment;

DETAILED DESCRIPTION OF NON-LIMITING EXAMPLE EMBODIMENTS

A description is given below of a game system, a game apparatus, a game program, an operation determination method, and an information processing apparatus according to an exemplary embodiment. An information processing system 1 as an example of game system according to the exemplary embodiment includes a main body apparatus (information processing apparatus; acts as a game apparatus main body in the exemplary embodiment) 2, a left controller 3, and a right controller 4. In the information processing system 1 according to the exemplary embodiment, the left controller 3 and the right controller 4 are attachable to, and detachable from, the main body apparatus 2. The information processing system 1 is usable as an integrated apparatus in a state where the left controller 3 and the right controller 4 are attached to the main body apparatus 2. Alternatively, the main body apparatus 2, the left controller 3 and the right controller 4 are usable as separate bodies (see FIG. 2). The information processing system 1 is usable in a form in which an image is displayed on the main body apparatus 2, and in a form in which an image is displayed on another display apparatus (e.g., stationary monitor) such as a TV or the like. In the former form, the information processing system 1 is usable as a mobile apparatus (e.g., mobile game apparatus). In the latter form, the information processing system 1 is usable as a stationary apparatus (e.g., stationary game apparatus).

Figure 1:
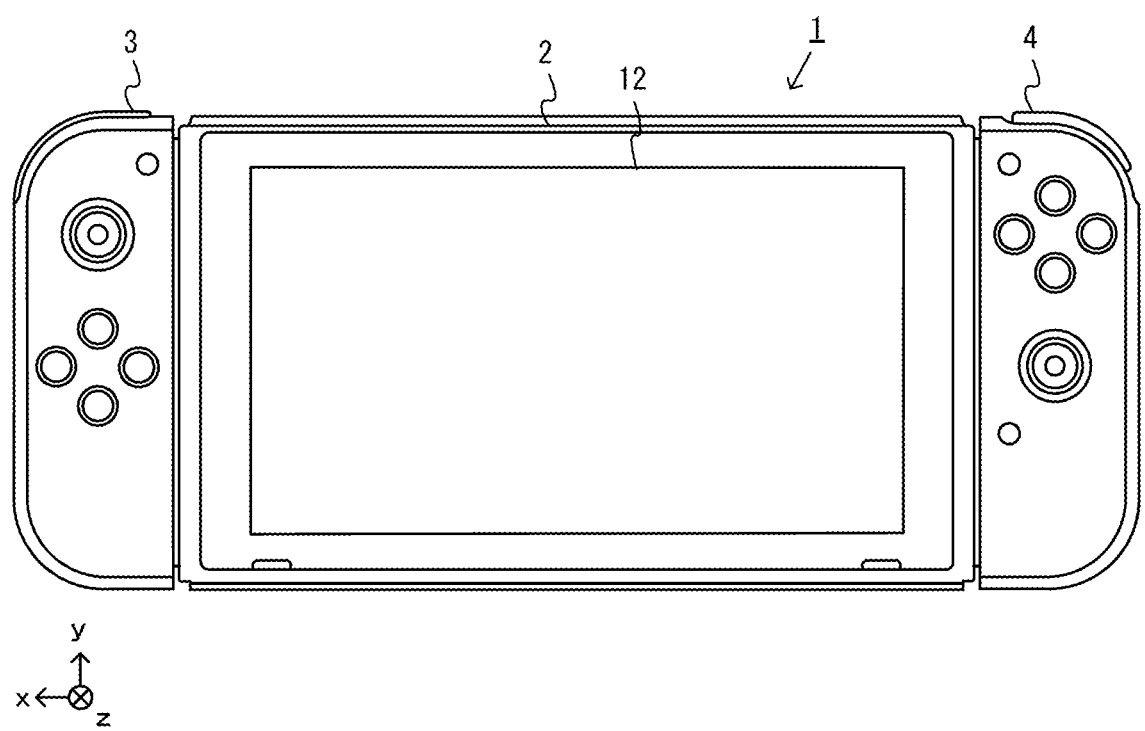
FIG. 1 shows a non-limiting example of state of an information processing system 1 according to the exemplary embodiment where a left controller 3 and a right controller 4 are attached to a main body apparatus 2.
Figure 1:
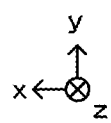

FIG. 1 shows a state where the left controller 3 and the right controller 4 are attached to the main body apparatus 2 in an example of the information processing system 1 according to the exemplary embodiment. As shown in FIG. 1, the information processing system 1 includes the main body apparatus 2, the left controller 3, and the right controller 4. The left controller 3 and the right controller 4 are attached to, and integrated with, the main body apparatus 2. The main body apparatus 2 is an apparatus that executes various processes (e.g., game process) in the information processing system 1. The main body apparatus 2 includes a display 12. The left controller 3 and the right controller 4 are each a device including an operation section allowing a user to make an input thereto.

Figure 2:
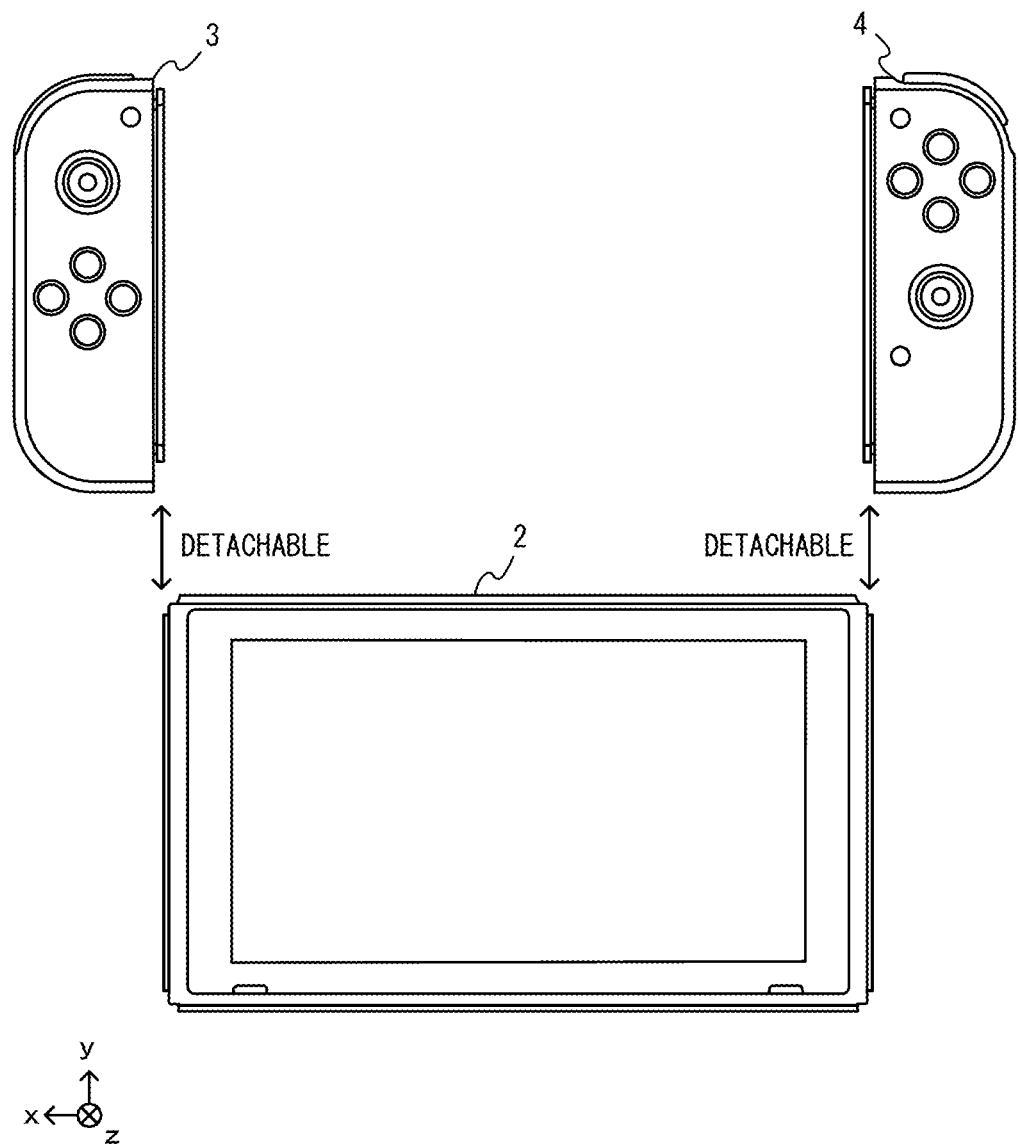
FIG. 2 shows a non-limiting example of state where the left controller 3 and the right controller 4 are detached from the main body apparatus 2.

FIG. 2 shows an example of state where the left controller 3 and the right controller 4 are detached from the main body apparatus 2. As shown in FIG. 1 and FIG. 2, the left controller 3 and the right controller 4 are attachable to, and detachable from, the main body apparatus 2. The left controller 3 is attachable to a left side surface (side surface on a positive side in an x-axis direction shown in FIG. 1) of the main body apparatus 2, and is attachable to, and detachable from, the main body apparatus 2 by being slid along the left side surface of the main body apparatus 2 in a y-axis direction shown in FIG. 1. The right controller 4 is attachable to a right side surface (side surface on a negative side in the x-axis direction shown in FIG. 1) of the main body apparatus 2, and is attachable to, and detachable from, the main body apparatus 2 by being slide along the right side surface of the main body apparatus 2 in the y-axis direction shown in FIG. 1. Hereinafter, the left controller 3 and the right controller 4 will occasionally be referred to collectively as "controllers". In the exemplary embodiment, an "operation device" operable by a single user may be a single controller (e.g., one of the left controller 3 and the right controller 4) or a plurality of controllers (e.g., both the left controller 3 and the right controller 4, or at least either the left controller 3 or the right controller 4 and another controller). The "operation device" includes at least one controller. Hereinafter, an example of specific configuration of the main body apparatus 2, the left controller 3, and the right controller 4 will be described.

Figure 3:
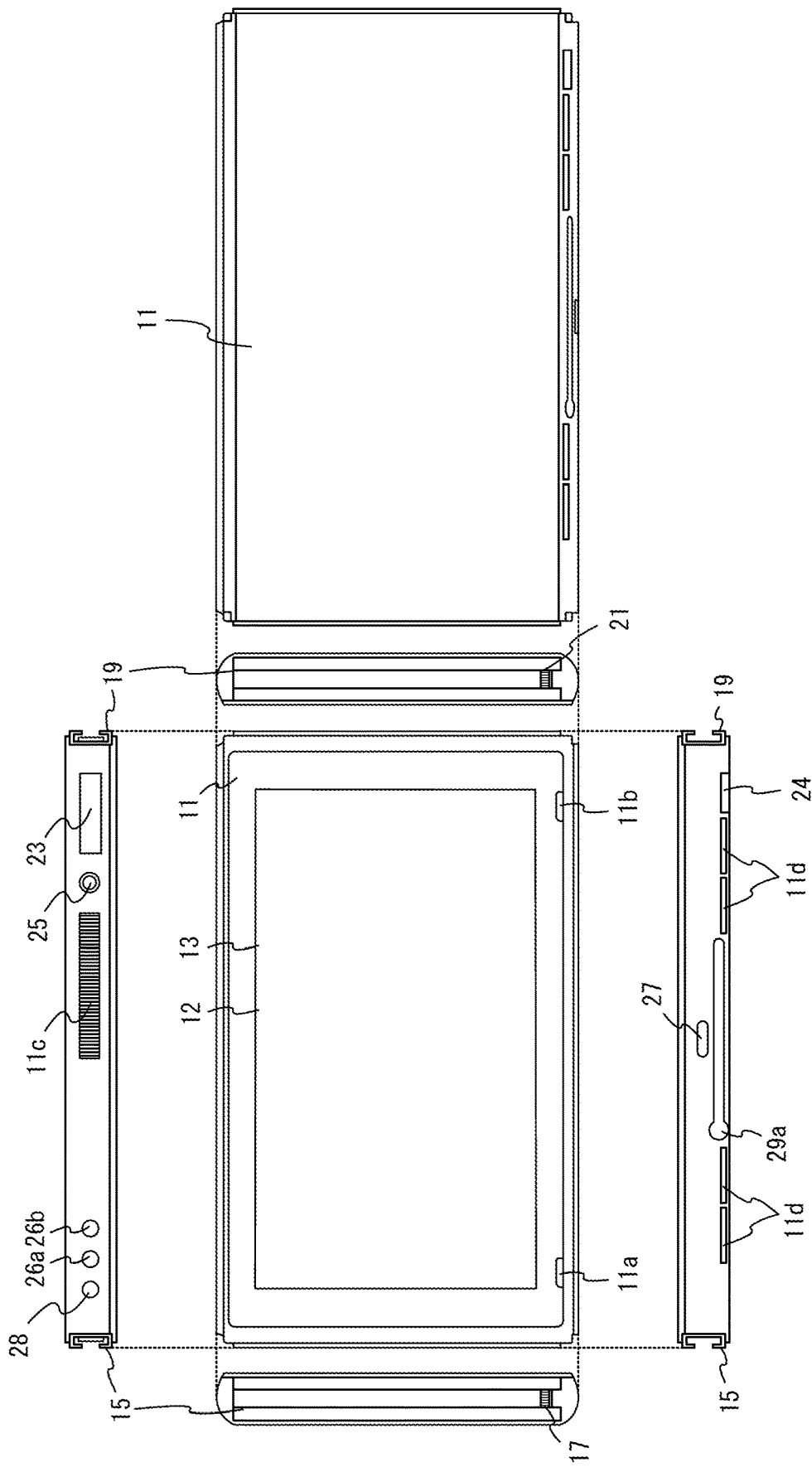
FIG. 3 provides six orthogonal views showing a non-limiting example of the main body apparatus 2.

FIG. 3 provides six orthogonal views showing an example of the main body apparatus 2. As shown in FIG. 3, the main body apparatus 2 includes a generally plate-shaped housing 11. In the exemplary embodiment, a main surface of the housing 11 (in other words, a front surface, i.e., a surface on which the display 12 is provided) has a roughly rectangular shape. In the exemplary embodiment, the housing 11 is longer in a left-right direction as described below. In the exemplary embodiment, a longer direction of the main surface of the housing 11 (i.e., x-axis direction shown in FIG. 1) will be referred to as a "width direction" (also referred to as the "left-right direction"), and a short direction of the main surface (i.e., y-axis direction shown in FIG. 1) will be referred to as a "length direction" (also referred to as an "up-down direction"). A direction perpendicular to the main surface (i.e., z-axis direction shown in FIG. 1) will be referred to as a "depth direction" (also referred to as a "front-rear direction"). The main body apparatus 2 is usable in an orientation in which the width direction extends in the horizontal direction. The main body apparatus 2 is also usable in an orientation in which the length direction extends in the horizontal direction. In this case, the housing 11 may be considered as being longer in the vertical direction.

The housing 11 may have any shape and size. For example, the housing 11 may have a mobile size. A single body of the main body apparatus 2, or an integrated apparatus including the main body apparatus 2 and the left and right controllers 3 and 4 attached thereto, may act as a mobile apparatus. Alternatively, the main body apparatus 2 or the integrated apparatus may act as a handheld apparatus. Still alternatively, the main body apparatus 2 or the integrated apparatus may act as a portable apparatus.

As shown in FIG. 3, the main body apparatus 2 includes the display 12 provided on the main surface of the housing 11. The display 12 displays an image (a still image or a moving image) acquired or generated by the main body apparatus 2. In the exemplary embodiment, the display 12 is a liquid crystal display device (LCD). Alternatively, the display 12 may be a display apparatus of any type.

The main body apparatus 2 includes a touch panel 13 provided on a screen of the display 12. In the exemplary embodiment, the touch panel 13 is of a type that allows a multi-touch input to be made (e.g., of an electrostatic capacitance type). Alternatively, the touch panel 13 may be of any type. For example, the touch panel 13 may be of a type that allows a single-touch input to be made (e.g., of a resistive type).

The main body apparatus 2 includes speakers (speakers 88 shown in FIG. 6) accommodated in the housing 11. As shown in FIG. 3, the main surface of the housing 11 has speaker holes 11a and 11b formed therein. The speakers 88 output a sound through the speaker holes 11a and 11b.

As shown in FIG. 3, the main body apparatus 2 includes a left rail member 15 provided on the left side surface of the housing 11. The left rail member 15 is provided to allow the left controller 3 to be detachably attached to the main body apparatus 2. The left rail member 15 extends in the up-down direction on the left side surface of the housing 11. The left rail member 15 is so shaped as to be engageable with a slider in the left controller 3 (slider 40 shown in FIG. 4), and a slide mechanism includes the left rail member 15 and the slider 40. The slide mechanism allows the left controller 3 to be slidably and detachably attached to the main body apparatus 2.

The main body apparatus 2 includes a left terminal 17. The left terminal 17 allows the main body apparatus 2 to communicate with the left controller 3 in a wired manner. The left terminal 17 is provided at a position where, in a case where the left controller 3 is attached to the main body apparatus 2, the left terminal 17 comes into contact with a terminal in the left controller 3 (terminal 42 shown in FIG. 4). The specific position of the left terminal 17 is optional. In the exemplary embodiment, as shown in FIG. 3, the left terminal 17 is provided on a bottom surface of a groove in the left rail member 15. In the exemplary embodiment, the left terminal 17 is provided near a lower end on the bottom surface of the groove of the left rail member 15.

As shown in FIG. 3, components similar to the components provided on the left side surface of the housing 11 are provided on the right side of the housing 11. Specifically, the main body apparatus 2 includes a right rail member 19 provided on the right side surface of the housing 11. The right rail member 19 extends in the up-down direction on the right side surface of the housing 11. The right rail member 19 is so shaped as to be engageable with a slider in the right controller 4 (slider 62 shown in FIG. 5), and a slide mechanism includes the right rail member 19 and the slider 62. The slide mechanism allows the right controller 4 to be slidably and detachably attached to the main body apparatus 2.

The main body apparatus 2 includes a right terminal 21. The right terminal 21 is provided to allow the main body apparatus 2 to communicate with the right controller 4 in a wired manner. The right terminal 21 is provided at a position where, in a case where the right controller 4 is attached to the main body apparatus 2, the right terminal 21 comes into contact with a terminal in the right controller 4 (terminal 64 shown in FIG. 5). The specific position of the right terminal 21 is optional. In the exemplary embodiment, as shown in FIG. 3, the right terminal 21 is provided on a bottom surface of a groove in the right rail member 19. In the exemplary embodiment, the right terminal 21 is provided near a lower end of the bottom surface of the groove of the right rail member 19.

As shown in FIG. 3, the main body apparatus 2 includes a first slot 23. The first slot 23 is provided in an upper side surface of the housing 11. The first slot 23 is so shaped as to allow a first type storage medium to be attached to the first slot 23. The first type storage medium is, for example, a dedicated storage medium (e.g., dedicated memory card) for the information processing system 1 and an information processing apparatus of the same type as that of the information processing system 1. The first type storage medium is used to, for example, store data usable by the main body apparatus 2 (e.g., saved data of an application or the like) and/or a program executable by the main body apparatus 2 (e.g., program for an application or the like). The main body apparatus 2 includes a power button 28. As shown in FIG. 3, the power button 28 is provided on the upper side surface of the housing 11. The power button 28 is provided to switch the power supply of the main body apparatus 2 between an on-state and an off-state.

The main body apparatus 2 includes a sound input/output terminal (specifically, earphone jack) 25. That is, the main body apparatus 2 allows a microphone or an earphone to be attached to the sound input/output terminal 25. As shown in FIG. 3, the sound input/output terminal 25 is provided on the upper side surface of the housing 11.

The main body apparatus 2 includes sound volume buttons 26a and 26b. As shown in FIG. 3, the sound volume buttons 26a and 26b are provided on the upper side surface of the housing 11. The sound volume buttons 26a and 26b are provided to give an instruction to adjust the volume of a sound output from the main body apparatus 2. The sound volume button 26a is provided to give an instruction to turn down the sound volume, and the sound volume button 26b is provided to give an instruction to turn up the sound volume.

The housing 11 includes an exhaust hole 11c formed thereon. As shown in FIG. 3, the exhaust hole 11c is formed in the upper side surface of the housing 11. The exhaust hole 11c is formed to exhaust (in other words, release) heat generated inside the housing 11 to outside the housing 11. That is, the exhaust hole 11c may be called a heat discharge hole.

The main body apparatus 2 includes a lower terminal 27. The lower terminal 27 is provided to allow the main body apparatus 2 to communicate with a cradle. As shown in FIG. 3, the lower terminal 27 is provided on a lower side surface of the housing 11. In a case where the main body apparatus 2 is attached to the cradle, the lower terminal 27 is connected to a terminal of the cradle. In the exemplary embodiment, the lower terminal 27 is a USB connector (more specifically, a female connector). Only the main body apparatus 2, with the left controller 3 and the right controller 4 being detached therefrom, may be mounted on the cradle. In another example, the integrated apparatus including the main body apparatus 2 and the left and right controllers 3 and 4 attached thereto may be mounted on the cradle. The cradle is communicable (via wired communication or wireless communication) with a stationary monitor (e.g., stationary TV), which is an example of external display apparatus separate from the main body apparatus 2. In a case where the integrated apparatus or a single body of the main body apparatus 2 is mounted on the cradle, the information processing system 1 displays, on the stationary monitor, an image acquired or generated by the main body apparatus 2. In the exemplary embodiment, the cradle has a function of charging the integrated apparatus or a single body of the main body apparatus 2 mounted thereon. The cradle has a function of a hub apparatus (specifically, a USB hub).

The main body apparatus 2 includes a second slot 24. In the exemplary embodiment, the second slot 24 is provided in the lower side surface of the housing 11. In another exemplary embodiment, the second slot 24 may be provided in the same surface as the first slot 23. The second slot 24 is so shaped as to allow a second type storage medium, different from the first type storage medium, to be attached to the second slot 24. The second type storage medium may be, for example, a general-purpose storage medium. For example, the second type storage medium may be an SD card. Similarly to the first type storage medium, the second type storage medium is used to, for example, store data usable by the main body apparatus 2 (e.g., saved data of an application or the like) and/or a program executable by the main body apparatus 2 (e.g., program for an application or the like).

The housing 11 includes an absorption holes 11d formed therein. As shown in FIG. 3, the air absorption holes 11d are formed in the lower side surface of the housing 11. The absorption holes 11d are formed to absorb (in other words, introduce) air outside the housing 11 into the housing 11. In the exemplary embodiment, the air absorption holes 11d are formed in the surface opposite to the surface in which the exhaust hole 11c is formed. Thus, heat in the housing 11 is released efficiently.

The shapes, the numbers, and the installation positions of the above-described components provided in the housing 11 (specifically, the buttons, the slots, the terminals, and the like) are optional. For example, in another exemplary embodiment, at least one of the power button 28 and the slots 23 and 24 may be provided on/in another side surface or a rear surface of the housing 11. Alternatively, in another exemplary embodiment, the main body apparatus 2 may not include at least one of the above-described components.

Figure 4:
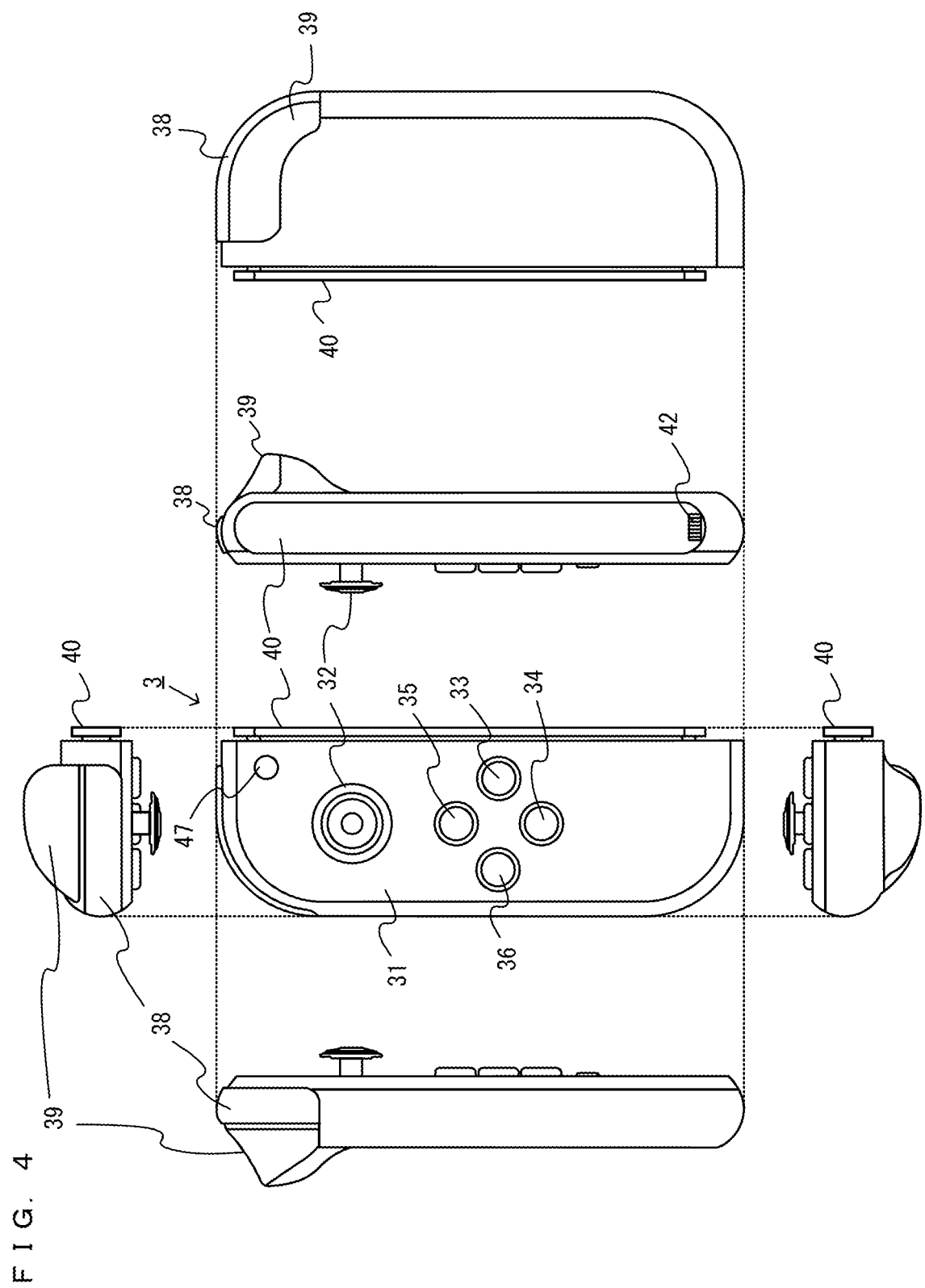
FIG. 4 provides six orthogonal views showing a non-limiting example of the left controller 3.

FIG. 4 provides six orthogonal views showing an example of the left controller 3. As shown in FIG. 4, the left controller 3 includes a housing 31. In the exemplary embodiment, the housing 31 is generally plate-shaped. A main surface of the housing 31 (in other words, a front surface. i.e., a surface on a negative side in the z-axis direction shown in FIG. 1) has a roughly rectangular shape. In the exemplary embodiment, the housing 31 is longer in the up-down direction in FIG. 1 (i.e., in the y-axis direction shown in FIG. 1). In a state of being detached from the main body apparatus 2, the left controller 3 may be held in an orientation in which the longer side extends in the vertical direction. The housing 31 has such a shape and such a size as to be held by one hand, particularly, with the left hand when being held in an orientation in which the longer side extends in the vertical direction. The left controller 3 may also be held in an orientation in which the longer side extends in the horizontal direction. In a case of being held in an orientation in which the longer side extends in the horizontal direction of, the left controller 3 may be held with both of two hands of the user. The housing 31 has any shape. In another exemplary embodiment, the housing 31 may not be generally plate-shaped. The housing 31 may not be rectangular, and may be, for example, semicircular. The housing 31 may not be vertically long.

The length in the up-down direction of the housing 31 is approximately equal to the length in the up-down direction of the housing 11 of the main body apparatus 2. The thickness of the housing 31 (i.e., length in the front-rear direction, in other words, the length in the z-axis direction shown in FIG. 1) is approximately equal to the thickness of the housing 11 of the main body apparatus 2. Thus, in a case where the left controller 3 is attached to the main body apparatus 2 (see FIG. 1), the user can hold the main body apparatus 2 and the left controller 3 with a feeling that he/she holds an integrated apparatus.

As shown in FIG. 4, the main surface of the housing 31 is shaped such that left corners thereof are more rounded than right corners thereof. Specifically, a connection portion between an upper side surface and a left side surface of the housing 31 and a connection portion between a lower side surface and the left side surface of the housing 31 are more rounded (in other words, are chamfered to have a greater roundness) than a connection portion between the upper side surface and a right side surface of the housing 31 and a connection portion between the lower side surface and the right side surface of the housing 31. Thus, in a case where the left controller 3 is attached to the main body apparatus 2 (see FIG. 1), the information processing system 1 as the integrated apparatus has a rounded shape on the left side. The information processing system 1 having such a shape is easy for the user to hold.

The left controller 3 includes an analog stick 32. As shown in FIG. 4, the analog stick 32 is provided on the main surface of the housing 31. The analog stick 32 is an example of direction input section usable to input a direction. The analog stick 32 includes a stick member that can be inclined in all directions parallel to the main surface of the housing 31 (i.e., 360° directions including up, down, left, right, and oblique directions). The user may incline the stick member to input a direction corresponding to a direction of the inclination (and to input a magnitude corresponding to an angle of the inclination). The direction input section may be a cross key, a slide stick, or the like. In the exemplary embodiment, the stick member may be pressed (in a direction perpendicular to the housing 31) to make an input operation. That is, the analog stick 32 is an input section usable to input a direction and a magnitude corresponding to the direction of inclination and the amount of inclination of the stick member, and also usable to make a press input operation on the stick member.

The left controller 3 includes four operation buttons 33 through 36 (specifically, a right direction button 33, a down direction button 34, an up direction button 35, and a left direction button 36). As shown in FIG. 4, the four operation buttons 33 through 36 are provided below the analog stick 32 on the main surface of the housing 31. In the exemplary embodiment, the four operation buttons are provided on the main surface of the left controller 3. The number of operation buttons is optional. The operation buttons 33 through 36 are used to give instructions corresponding to various programs executable by the main body apparatus 2 (e.g., an OS program and an application program). In the exemplary embodiment, the operation buttons 33 through 36 are usable to input directions, and thus are termed the right direction button 33, the down direction button 34, the up direction button 35, and the left direction button 36. Alternatively, the operation buttons 33 through 36 may be used to give instructions other than directions.

The left controller 3 includes a "−" (minus) button 47. As shown in FIG. 4, the "−" button 47 is provided on the main surface of the housing 31, more specifically, is provided on an upper right area of the main surface. The "−" button 47 is used to give instructions corresponding to various programs executable by the main body apparatus 2 (e.g., an OS program and an application program). The "−" button 47 is used as, for example, a select button in a game application (e.g., as a button used to switch a selectable item).

In a case where the left controller 3 is attached to the main body apparatus 2, the operation sections provided on the main surface of the left controller 3 (specifically, the analog stick 32 and the buttons 33 through 36 and 47) are operated with, for example, the thumb of the left hand of the user holding the information processing system 1 as the integrated apparatus. In a case where the left controller 3 is used while being detached from the main body apparatus 2 and held in a horizontal orientation with both of two hands of the user, the above-described operation sections are operated with, for example, the thumbs of the left and right hands of the user holding the left controller 3. Specifically, in this case, the analog stick 32 is operated with the thumb of the left hand of the user, and the operation buttons 33 through 36 are operated with the thumb of the right hand of the user.

The left controller 3 includes a first L-button 38. The left controller 3 includes a ZL-button 39. Similarly to the operation buttons 33 through 36, the operation buttons 38 and 39 are used to give instructions corresponding to various programs executable by the main body apparatus 2. As shown in FIG. 4, the first L-button 38 is provided on an upper left portion of the side surface of the housing 31. The ZL-button 39 is provided on an upper left portion from the side surface to a rear surface of the housing 31 (more precisely, an upper left portion when the housing 31 is viewed from the front side thereof). That is, the ZL-button 39 is provided to the rear of the first L-button 38 (on a positive side in the z-axis direction shown in FIG. 1). In the exemplary embodiment, the upper left portion of the housing 31 has a rounded shape. Therefore, the first L-button 38 and the ZL-button 39 each have a rounded shape corresponding to the roundness of the upper left portion of the housing 31. In a case where the left controller 3 is attached to the main body apparatus 2, the first L-button 38 and the ZL-button 39 are located on an upper left portion of the information processing system 1 as the integrated apparatus.

The left controller 3 includes the slider 40 described above. As shown in FIG. 4, the slider 40 extends in the up-down direction on the right side surface of the housing 31. The slider 40 is so shaped as to be engageable with the left rail member 15 of the main body apparatus 2 (more specifically, with the groove in the left rail member 15). Thus, the slider 40, when being engaged with the left rail member 15, is secured so as not to be detached in a direction perpendicular to a slide direction (the slide direction is, in other words, the direction in which the left rail member 15 extends).

The left controller 3 includes the terminal 42 usable by the left controller 3 to communicate with the main body apparatus 2 in a wired manner. The terminal 42 is provided at a position where, in a case where the left controller 3 is attached to the main body apparatus 2, the terminal 42 comes into contact with the left terminal 17 (FIG. 3) of the main body apparatus 2. The specific position of the terminal 42 is optional. In the exemplary embodiment, as shown in FIG. 4, the terminal 42 is provided on an attachment surface to which the slider 40 is attached. In the exemplary embodiment, the terminal 42 is provided near a lower end on the attachment surface of the slider 40.

Figure 5:
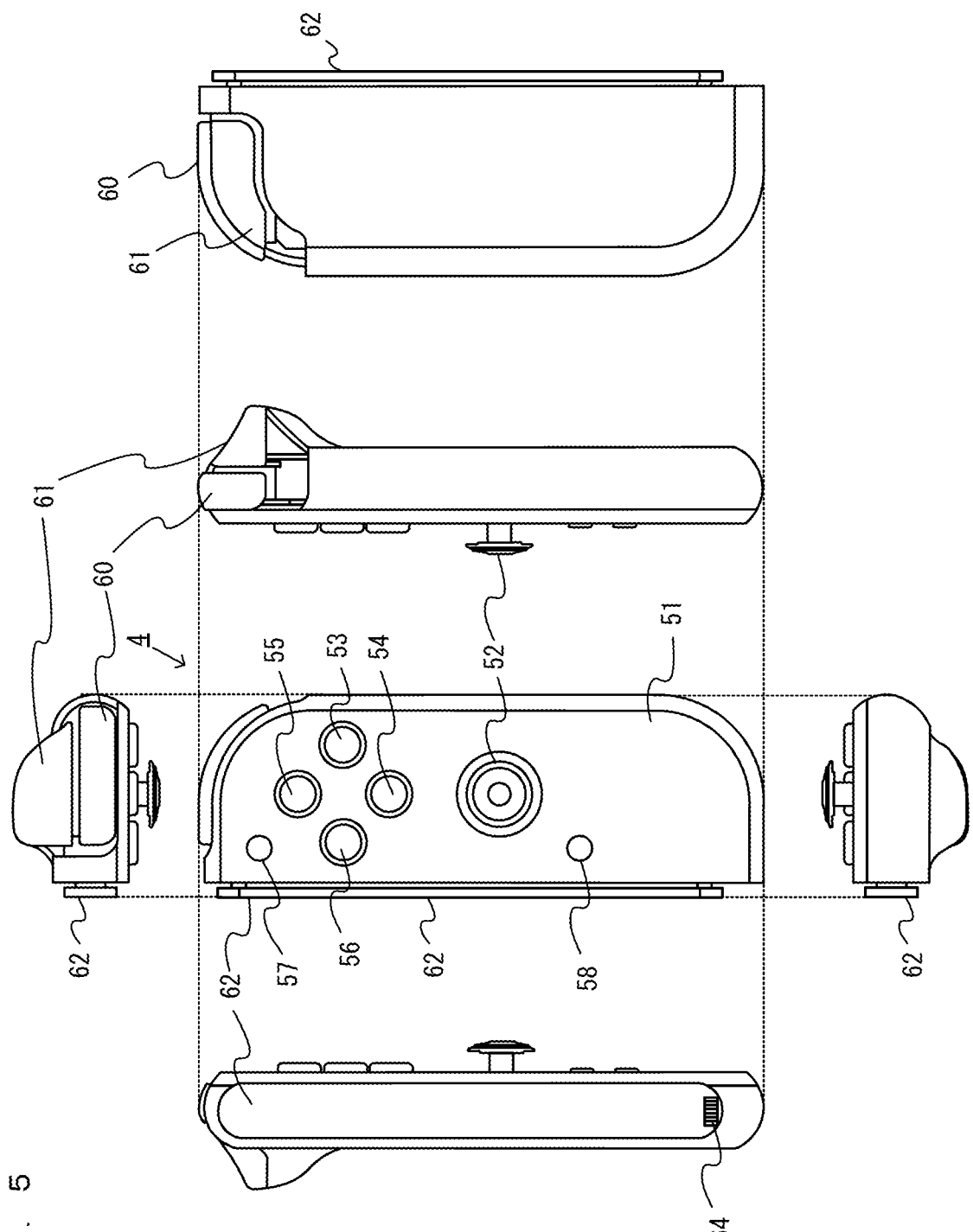
FIG. 5 provides six orthogonal views showing a non-limiting example of the right controller 4.

FIG. 5 provides six orthogonal views showing an example of the right controller 4. As shown in FIG. 5, the right controller 4 includes a housing 51. In the exemplary embodiment, the housing 51 is generally plate-shaped. A main surface of the housing 51 (in other words, a front surface, i.e., a surface on the negative side in the z-axis direction shown in FIG. 1) has a roughly rectangular shape. In the exemplary embodiment, the housing 51 is longer in the up-down direction in FIG. 1. In a state of being detached from the main body apparatus 2, the right controller 4 may be held in an orientation in which the longer side extends in the vertical direction. The housing 51 has such a shape and such a size as to be held by one hand, particularly, with the right hand when being held in an orientation in which the longer side extends in the vertical direction. The right controller 4 may also be held in an orientation in which the longer side extends in the horizontal direction. In a case of being held in an orientation in which the longer side extends in the horizontal direction, the right controller 4 may be held with both of two hands of the user.

Similarly to the case of the housing 31 of the left controller 3, the length in the up-down direction of the housing 51 of the right controller 4 is approximately equal to the length in the up-down direction of the housing 11 of the main body apparatus 2, and the thickness of the housing 51 is approximately equal to the thickness of the housing 11 of the main body apparatus 2. Thus, in a case where the right controller 4 is attached to the main body apparatus 2 (see FIG. 1), the user can hold the main body apparatus 2 and the right controller 4 with a feeling that he/she holds an integrated apparatus.

As shown in FIG. 5, the main surface of the housing 51 is shaped such that right corners thereof are more rounded than left corners thereof. Specifically, a connection portion between an upper side surface and a right side surface of the housing 51 and a connection portion between a lower side surface and the right side surface of the housing 51 are more rounded (in other words, are chamfered to have a greater roundness) than a connection portion between the upper side surface and a left side surface of the housing 51 and a connection portion between the lower side surface and the left side surface of the housing 51. Thus, in a case where the right controller 4 is attached to the main body apparatus 2 (see FIG. 1), the information processing system 1 as the integrated apparatus has a rounded shape on the right side. The information processing system 1 having such a shape is easy for the user to hold.

Similarly to the left controller 3, the right controller 4 includes an analog stick 52 as a direction input section. In the exemplary embodiment, the analog stick 52 has the same configuration as that of the analog stick 32 of the left controller 3. Similarly to the left controller 3, the right controller 4 includes four operation buttons 53 through 56 (specifically, an A-button 53, a B-button 54, an X-button 55, and a Y-button 56). In the exemplary embodiment, the four operation buttons 53 through 56 have the same mechanism as that of the four operation buttons 33 through 36 of the left controller 3. As shown in FIG. 5, the analog stick 52 and the operation buttons 53 through 56 are provided on the main surface of the housing 51. In the exemplary embodiment, the four operation buttons are provided on the main surface of the right controller 4. The number of operation buttons is optional.

Now, in the exemplary embodiment, the positional relationship between the two types of operation sections (the analog stick and the operation buttons) of the right controller 4 is opposite to the positional relationship between the corresponding two types of operation sections of the left controller 3. That is, in the right controller 4, the analog stick 52 is located below the operation buttons 53 through 56, whereas in the left controller 3, the analog stick 32 is located above the operation buttons 33 through 36. With such a positional arrangement, the left controller 3 and the right controller 4 are usable with similar operation feelings to each other when being detached from the main body apparatus 2.

The right controller 4 includes a "+" (plus) button 57. As shown in FIG. 5, the "+" button 57 is provided on the main surface of the housing 51, more specifically, is provided on an upper left area of the main surface. Similarly to the other operation buttons 53 through 56, the "+" button 57 is used to give instructions corresponding to various programs executable by the main body apparatus 2 (e.g., an OS program and an application program). The "+" button 57 is used as, for example, a start button in a game application (e.g., as a button used to give an instruction to start a game).

The right controller 4 includes a home button 58. As shown in FIG. 5, the home button 58 is provided on the main surface of the housing 51, more specifically, is provided on a lower left area of the main surface. The home button 58 is used to display a predetermined menu screen on the display 12 of the main body apparatus 2. The menu screen, for example, allows an application, specified by the user from one or more applications executable by the main body apparatus 2, to be started. The menu screen may be displayed, for example, when the main body apparatus 2 is started. In the exemplary embodiment, when the home button 58 is pressed in the state where an application is being executed by the main body apparatus 2 (i.e., in the state where an image of the application is displayed on the display 12), a predetermined operation screen may be displayed on the display 12 (at this point, the menu screen may be displayed instead of the operation screen). The operation screen, for example, allows an instruction to finish the application and display the menu screen on the display 12, an instruction to resume the application, or the like, to be given.

In a case where the right controller 4 is attached to the main body apparatus 2, the operation sections (specifically, the analog stick 52 and the buttons 53 through 58) provided on the main surface of the right controller 4 are operated with, for example, the thumb of the right hand of the user holding the information processing system 1. In a case where the right controller 4 is used while being detached from the main body apparatus 2 and held in a horizontal orientation with both of two hands of the user, the above-described operation sections are operated with, for example, the thumbs of the left and right hands of the user holding the right controller 4. Specifically, in this case, the analog stick 52 is operated with the thumb of the left hand of the user, and the operation buttons 53 through 56 are operated with the thumb of the right hand of the user.

The right controller 4 includes a first R-button 60. The right controller 4 includes a ZR-button 61. As shown in FIG. 5, the first R-button 60 is provided on an upper right portion of the side surface of the housing 51. The ZR-button 61 is provided on an upper right portion from the side surface to a rear surface of the housing 51 (more precisely, an upper right portion when the housing 51 is viewed from the front side thereof). That is, the ZR-button 61 is provided to the rear of the first R-button 60 (on the positive side in the z-axis direction shown in FIG. 1). In the exemplary embodiment, the upper right portion of the housing 51 has a rounded shape. Therefore, the first R-button 60 and the ZR-button 61 each have a rounded shapes corresponding to the roundness of the upper right portion of the housing 51. In a case where the right controller 4 is attached to the main body apparatus 2, the first R-button 60 and the ZR-button 61 are located on an upper right portion of the information processing system 1.

The left controller 3 includes a slider mechanism similar to that of the left controller 3. That is, the right controller 4 includes the slider 62 described above. As shown in FIG. 5, the slider 62 extends in the up-down direction on the left side surface of the housing 51. The slider 62 is so shaped as to be engageable with the right rail member 19 of the main body apparatus 2 (more specifically, with the groove in the right rail member 19). Thus, the slider 62, when being engaged with the right rail member 19, is secured so as not to be detached in a direction perpendicular to the slide direction (the slide direction is, in other words, the direction in which the right rail member 19 extends).

The right controller 4 includes the terminal 64 usable by the right controller 4 to communicate with the main body apparatus 2 in a wired manner. The terminal 64 is provided at a position where, in a case where the right controller 4 is attached to the main body apparatus 2, the terminal 64 comes into contact with the right terminal 21 (FIG. 3) of the main body apparatus 2. The specific position of the terminal 64 is optional. In the exemplary embodiment, as shown in FIG. 5, the terminal 64 is provided on an attachment surface to which the slider 62 is attached. In the exemplary embodiment, the terminal 64 is provided near a lower end on the attachment surface of the slider 62.

Regarding the left controller 3 and the right controller 4, the shapes, the numbers, and the installation positions of the above-described components provided in the housings 31 and 51 (specifically, the sliders, the sticks, the buttons, and the like) are optional. For example, in another exemplary embodiment, the left controller 3 and the right controller 4 may each include a direction input section of a type different from that of the analog stick. The slider 40 or 62 may be located at a position corresponding to the position of the rail member 15 or 19 provided in the main body apparatus 2, for example, on the main surface or the rear surface of the housing 31 or 51. In still another exemplary embodiment, the left controller 3 and the right controller 4 may not include at least one of the above-described components.

Figure 6:
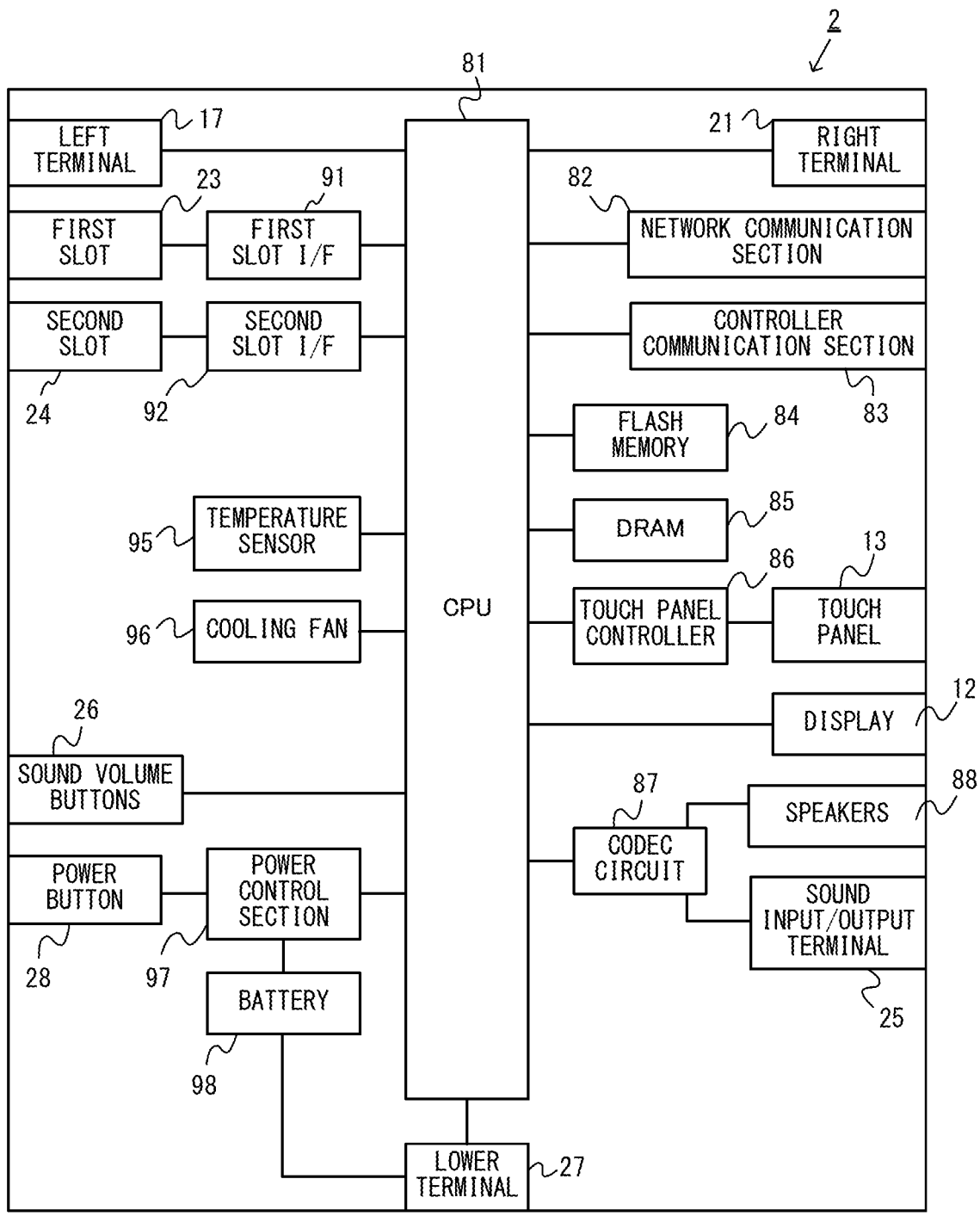
FIG. 6 is a block diagram showing a non-limiting example of internal structure of the main body apparatus 2.

FIG. 6 is a block diagram showing a non-limiting example of internal structure of the main body apparatus 2. The main body apparatus 2 includes components 81 through 98 shown in FIG. 6 in addition to the components shown in FIG. 3. At least one of the components 81 through 98 may be mounted as an electronic component on an electronic circuit board and accommodated in the housing 11.

The main body apparatus 2 includes a CPU (Central Processing Unit) 81. The CPU 81 is an information processing section that executes various types of information process executable by the main body apparatus 2. The CPU 81 executes an information processing program (e.g., game program) stored on a storage section (specifically, an internal storage medium such as a flash memory 84 or the like, an external storage medium attached to each of the slots 23 and 24, or the like) to execute various types of information process.

The main body apparatus 2 includes the flash memory 84 and the DRAM (Dynamic Random Access Memory) 85 as examples of internal storage medium built in the main body apparatus 2. The flash memory 84 and the DRAM 85 are connected with the CPU 81. The flash memory 84 is mainly usable to store various pieces of data (or programs) to be saved on the main body apparatus 2. The DRAM 85 is usable to temporarily store various pieces of data used for the information process.

The main body apparatus 2 includes a first slot interface (hereinafter, the "interface" will be abbreviated as "I/F") 91. The main body apparatus 2 includes a second slot I/F 92. The first slot I/F 91 and the second slot I/F 92 are connected with the CPU 81. The first slot I/F 91 is connected with the first slot 23, and follows an instruction from the CPU 81 to read and write data from and to the first type storage medium (e.g., SD card) attached to the first slot 23. The second slot I/F 92 is connected with the second slot 24, and follows an instruction from the CPU 81 to read and write data from and to the second type storage medium (e.g., dedicated memory card) attached to the second slot 24.

The CPU 81 appropriately transfers data between the flash memory 84/the DRAM 85 and the above-described storage mediums to execute the above-described information process.

The main body apparatus 2 includes a network communication section 82. The network communication section 82 is connected with the CPU 81. The network communication section 82 communicates (specifically, via wireless communication) with an external apparatus via a network. In the exemplary embodiment, in a first communication form, the network communication section 82 is connected with a wireless LAN by a system compliant with the Wi-Fi standards to communicate with an external apparatus. In a second communication form, the network communication section 82 wirelessly communicates with another main body apparatus 2 of the same type by a predetermined communication system (e.g., communication based on an original protocol or infrared light communication). The wireless communication in the second communication form may be performed with another main body apparatus 2 located in a closed local network area and thus realizes a so-called "local communication", in which a plurality of the main body apparatuses 2 are communicated directly to each other to transmit and receive data.

The main body apparatus 2 includes a controller communication section 83. The controller communication section 83 is connected with the CPU 81. The controller communication section 83 wirelessly communicates with the left controller 3 and/or the right controller 4. The communication system between the main body apparatus 2 and the left controller 3 or the right controller 4 is optional. In the exemplary embodiment, the controller communication section 83 performs communication compliant with the Bluetooth (registered trademark) standards with the left controller 3 and with the right controller 4.

The CPU 81 is connected with the left terminal 17, the right terminal 21, and the lower terminal 27. When communicating with the left controller 3 in a wired manner, the CPU 81 transmits data to the left controller 3 via the left terminal 17 and also receives operation data from the left controller 3 via the left terminal 17. When communicating with the right controller 4 in a wired manner, the CPU 81 transmits data to the right controller 4 via the right terminal 21 and also receives operation data from the right controller 4 via the right terminal 21. When communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. In a case where the integrated apparatus including the main body apparatus 2 and the left and right controllers 3 and 4 attached thereto, or a single body of the main body apparatus 2, is attached to the cradle, the main body apparatus 2 outputs data (e.g., image data or sound data) to a stationary monitor or the like via the cradle.

The main body apparatus 2 can communicate with a plurality of the left controllers 3 simultaneously (in other words, in parallel). The main body apparatus 2 can communicate with a plurality of the right controllers 4 simultaneously (in other words, in parallel). Thus, the user can input data to the main body apparatus 2 using the plurality of left controllers 3 and the plurality of right controllers 4.

The main body apparatus 2 includes a touch panel controller 86, which is a circuit that controls the touch panel 13. The touch panel controller 86 is connected between the touch panel 13 and the CPU 81. Based on a signal from the touch panel 13, the touch panel controller 86 generates data indicating, for example, the position where a touch input has been provided. Then, the touch panel controller 86 outputs the data to the CPU 81.

The display 12 is connected with the CPU 81. The CPU 81 displays, on the display 12, an generated image (e.g., image generated by executing the above-described information process) and/or an externally acquired image.

The main body apparatus 2 includes a codec circuit 87 and the speakers (specifically, a left speaker and a right speaker) 88. The codec circuit 87 is connected with the speakers 88 and the sound input/output terminal 25 and also connected with the CPU 81. The codec circuit 87 controls the input and output of sound data to and from the speakers 88 and the sound input/output terminal 25. Specifically, when receiving sound data from the CPU 81, the codec circuit 87 performs D/A conversion on the sound data and outputs a resultant sound signal to the speakers 88 or the sound input/output terminal 25. As a result, a sound is output from the speakers 88 or a sound output section (e.g., earphone) connected with the sound input/output terminal 25. When receiving a sound signal from the sound input/output terminal 25, the codec circuit 87 performs A/D conversion on the sound signal and outputs resultant sound data in a predetermined format to the CPU 81. The sound volume buttons 26 are connected with the CPU 81. Based on an input to the sound volume buttons 26, the CPU 81 controls the volume of the sound to be output from the speakers 88 or the sound output section.

The main body apparatus 2 includes a power control section 97 and a battery 98. The power control section 97 is connected with the battery 98 and the CPU 81. Although not shown in FIG. 8, the power control section 97 is connected with various components of the main body apparatus 2 (specifically, components that receive power supplied from the battery 98, the left terminal 17, and the right terminal 21). Based on a command from the CPU 81, the power control section 97 controls the supply of power from the battery 98 to the above-mentioned components. The power control section 97 is connected with the power button 28. Based on an input to the power button 28, the power control section 97 controls the supply of power to the above-mentioned components. Specifically, in a case where an operation of turning off the power supply is performed on the power button 28, the power control section 97 stops the supply of power to all or a part of the above-mentioned components. In a case where an operation of turning on the power supply is performed on the power button 28, the power control section 97 starts the supply of power to all or a part of the above-mentioned components. The power control section 97 outputs, to the CPU 81, information indicating an input to the power button 28 (specifically, information indicating whether or not the power button 28 has been pressed).

The battery 98 is connected with the lower terminal 27. In a case where an external charging apparatus (e.g., cradle) is connected with the lower terminal 27 and power is supplied to the main body apparatus 2 via the lower terminal 27, the battery 98 is charged with the supplied power.

The main body apparatus 2 includes a cooling fan 96 usable to release heat inside the main body apparatus 2. The cooling fan 96 is operated to introduce air outside the housing 11 through the absorption holes 11d and also to release air inside the housing 11 through the exhaust hole 11c, so that heat inside the housing 11 is released. The cooling fan 96 is connected with the CPU 81, and the operation of the cooling fan 96 is controlled by the CPU 81. The main body apparatus 2 includes a temperature sensor 95, which detects the temperature inside the main body apparatus 2. The temperature sensor 95 is connected with the CPU 81, and a detection result provided by the temperature sensor 95 is output to the CPU 81. Based on the detection result provided by the temperature sensor 95, the CPU 81 controls the operation of the cooling fan 96.

Figure 7:
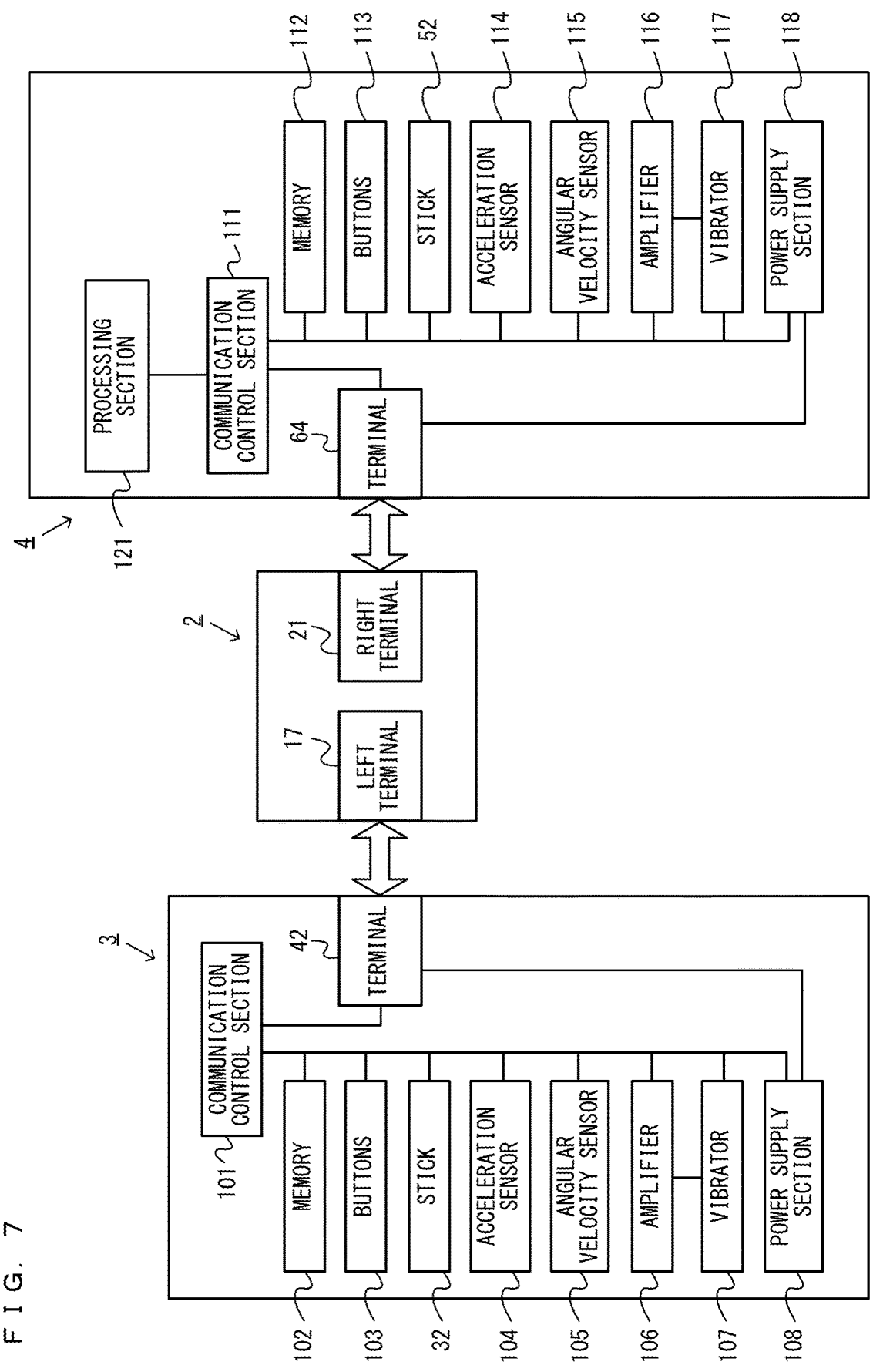
FIG. 7 is a block diagram showing a non-limiting example of internal configuration of the information processing system 1.

FIG. 7 is a block diagram showing an example of internal configuration of the information processing system 1. Among the components of the information processing system 1, the components of the main body apparatus 2 are shown in detail in FIG. 6 and thus are omitted in FIG. 7.

The left controller 3 includes a communication control section 101, which communicates with the main body apparatus 2. As shown in FIG. 7, the communication control section 101 is connected with components including the terminal 42. In the exemplary embodiment, the communication control section 101 can communicate with the main body apparatus 2 by wired communication via the terminal 42 and also by wireless communication with no use of the terminal 42. The communication control section 101 controls a method of communication performed by the left controller 3 with the main body apparatus 2. In a case where the left controller 3 is attached to the main body apparatus 2, the communication control section 101 communicates with the main body apparatus 2 via the terminal 42. In a case where the left controller 3 is detached from the main body apparatus 2, the communication control section 101 wirelessly communicates with the main body apparatus 2 (specifically, the controller communication section 83). The wireless communication between the controller communication section 83 and the communication control section 101 is performed in conformity to, for example, the Bluetooth (registered trademark) standards.

The left controller 3 includes a memory 102 such as, for example, a flash memory or the like. The communication control section 101 includes, for example, a microcomputer (or a microprocessor) and executes firmware stored on the memory 102 to perform various types of process.

The left controller 3 includes buttons 103 (specifically, the buttons 33 through 39, 43 and 44). The left controller 3 includes the analog stick ("stick" in FIG. 7) 32. The buttons 103 and the analog stick 32 each output information regarding an operation performed thereon to the communication control section 101 repeatedly at appropriate timing.

The left controller 3 includes an acceleration sensor 104. In the exemplary embodiment, the acceleration sensor 104 detects magnitudes of linear accelerations in predetermined three axis directions (e.g., X-, Y- and Z-axis directions shown in FIG. 8). The acceleration sensor 104 may detect an acceleration in one axis direction or accelerations in two axis directions. The left controller 3 includes an angular velocity sensor 105. In the exemplary embodiment, the angular velocity sensor 105 detects angular velocities about predetermined three axes (e.g., X, Y and Z axes shown in FIG. 8). The angular velocity sensor 105 may detect an angular velocity about one axis or angular velocities about two axes. The acceleration sensor 104 and the angular velocity sensor 105 are connected with the communication control section 101. Detection results provided by the acceleration sensor 104 and the angular velocity sensor 105 are each output to the communication control section 101 repeatedly at appropriate timing.

The communication control section 101 acquires information regarding an input (specifically, information regarding an operation or a detection result provided by any of the sensors) from each of the input sections (specifically, the buttons 103, the analog stick 32, and the sensors 104 and 105). The communication control section 101 transmits, to the main body apparatus 2, operation data including the acquired information (or information obtained by performing a predetermined process on the acquired information). The operation data is transmitted repeatedly at a rate of once every predetermined time period. The interval at which information regarding an input is transmitted to the main body apparatus 2 may or may not be the same among the input sections.

The above-mentioned operation data is transmitted to the main body apparatus 2, so that the main body apparatus 2 obtains the inputs provided to the left controller 3. That is, the main body apparatus 2 distinguishes operations made on the buttons 103 and the analog stick 32 from each other, based on the operation data. The main body apparatus 2 computes information regarding the motion and/or the attitude of the left controller 3 based on the operation data (specifically, the detection results provided by the acceleration sensor 104 and the angular velocity sensor 105).

The left controller 3 includes a vibrator 107 usable to give notification to the user by a vibration. In the exemplary embodiment, the vibrator 107 is controlled by a command from the main body apparatus 2. Specifically, upon receipt of the above-mentioned command from the main body apparatus 2, the communication control section 101 drives the vibrator 107 in accordance with the command. The left controller 3 includes an amplifier 106. Upon receipt of the above-mentioned command, the communication control section 101 outputs a control signal corresponding to the command to the amplifier 106. The amplifier 106 amplifies the control signal from the communication control section 101, generates a driving signal for driving the vibrator 107, and outputs the driving signal to the vibrator 107. As a result, the vibrator 107 is operated.

The left controller 3 includes a power supply section 108. In the exemplary embodiment, the power supply section 108 includes a battery and a power control circuit. Although not shown in FIG. 9, the power control circuit is connected with the battery and also connected with components of the left controller 3 (specifically, components that receive power supplied from the battery). The power control circuit controls the supply of power from the battery to the above-mentioned components. The battery is connected with the terminal 42. In the exemplary embodiment, in a case where the left controller 3 is attached to the main body apparatus 2, the battery is charged via the terminal 42 with power supplied from the main body apparatus 2 under a predetermined condition.

As shown in FIG. 7, the right controller 4 includes a communication control section 111, which communicates with the main body apparatus 2. The right controller 4 includes a memory 112, which is connected with the communication control section 111. The communication control section 111 is connected with components including the terminal 64. The communication control section 111 and the memory 112 have functions similar to those of the communication control section 101 and the memory 102, respectively, of the left controller 3. Thus, the communication control section 111 can communicate with the main body apparatus 2 by wired communication via the terminal 64 and also by wireless communication with no use of the terminal 64 (specifically, communication compliant with the Bluetooth (registered trademark) standards). The communication control section 111 controls a method of communication performed by the right controller 4 with the main body apparatus 2.

The right controller 4 includes input sections similar to the input sections of the left controller 3 (specifically, buttons 113, the analog stick 52, an acceleration sensor 114, and an angular velocity sensor 115). These input sections have functions similar to those of the input sections of the left controller 3 and operate similarly to the input sections of the left controller 3.

The right controller 4 includes a vibrator 117 and an amplifier 116. The vibrator 117 and the amplifier 116 operate similarly to the vibrator 107 and the amplifier 106, respectively, of the left controller 3. Specifically, the communication control section 111, in accordance with a command from the main body apparatus 2, uses the amplifier 116 to cause the vibrator 117 to operate.

The right controller 4 includes a power supply section 118. The power supply section 118 has a function similar to that of the power supply section 108 of the left controller 3, and operates similarly to the power supply section 108. That is, the power supply section 118 controls the supply of power to components that receive power supplied from a battery. In a case where the right controller 4 is attached to the main body apparatus 2, the battery is charged via the terminal 64 with power supplied from the main body apparatus 2 under a predetermined condition.

The right controller 4 includes a processing section 121. The processing section 121 is connected with the communication control section 111 and is also connected with an NFC communication section 122. The processing section 121, in accordance with a command from the main body apparatus 2, performs a process of managing the NFC communication section 122. For example, the processing section 121 controls an operation of the NFC communication section 122 in accordance with a command from the main body apparatus 2. The processing section 121 controls the start of the NFC communication section 122 or controls an operation of the NFC communication section 122 (specifically, reading, writing, or the like) performed on a communication partner thereof (e.g., NFC tag). The processing section 121 receives, from the main body apparatus 2 via the communication control section 111, information to be transmitted to the communication partner and passes the information to the NFC communication section 122. The processing section 121 also acquires, via the NFC communication section 122, information received from the communication partner and transmits the information to the main body apparatus 2 via the communication control section 111. In accordance with a command from the main body apparatus 2, the processing section 121 performs a process of managing an infrared image capturing section 123. For example, the processing section 121 causes the infrared image capturing section 123 to perform an image capturing operation, or acquires information based on an image capturing result (information of a captured image, information computed from such information, or the like) and transmits the information to the main body apparatus 2 via the communication control section 111.

As described above, in the information processing system 1 according to the exemplary embodiment, the left controller 3 and the right controller 4 are attachable to, and detachable from, the main body apparatus 2. Hereinafter, an operation of the information processing system 1 will be described in which an image (and a sound) is output to the main body apparatus 2 in a state where the left controller 3 and the right controller 4 are detached from the main body apparatus 2.

As described above, in the exemplary embodiment, the information processing system 1 is usable in a state where the left controller 3 and the right controller 4 are detached from the main body apparatus 2 (referred to as a "separate state"). The information processing system 1 in the separate state may be used by a plurality of users to make an operation on the same application (e.g., a game application) as follows: one of the plurality of users uses the left controller 3, and the other user uses the right controller 4. In a case where three or more user use the same application in this form of use, a plurality of pairs of the left controller 3 and the right controller 4 may be prepared, so that each of the users uses the left controller 3 or the right controller 4.

Figure 9:
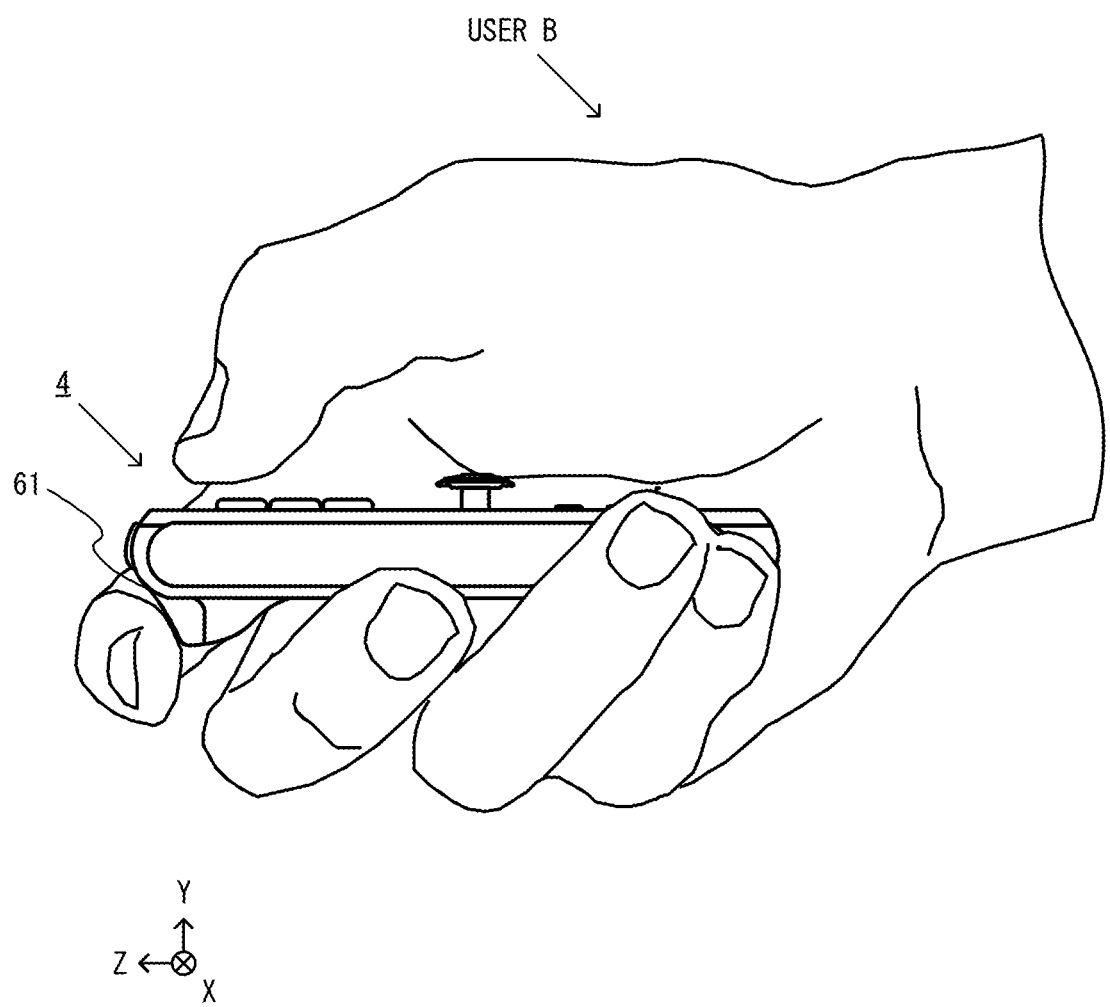
FIG. 9 shows a non-limiting example of how user B uses the information processing system 1 while holding a right controller 4 in a state where the right controller 4 is detached from the main body apparatus 2.

FIG. 8 shows an example of how user A uses the information processing system 1 while holding the left controller 3 in the separate state. FIG. 9 shows an example of how user B uses the information processing system 1 while holding the right controller 4 in the separate state. As shown in FIG. 8 and FIG. 9, the user A holds the left controller 3 with his/her right hand, and the user B holds the right controller 4 with his/her right hand, in the separate state to perform the respective operations. The user A and the user B may see an image displayed on the same main body apparatus 2 (display 12) or hear the sound output from the same main body apparatus 2 (speakers 88).

As described above, in the exemplary embodiment, as shown in FIG. 8, user A holds the left controller 3, which is longer in the up-down direction in FIG. 1 and is generally plate-shaped, with, for example, his/her right hand such that the left controller 3 is oriented as follows: an upward direction in the longer direction (upward direction in FIG. 1 (positive y-axis direction)) is directed forward (direction away from the user), the side surface facing the main body apparatus 2 when the left controller 3 is attached to the main body apparatus 2 (side surface on which the slider 40 is provided) is directed rightward, and the main surface (surface on which the analog stick 32 and the like are provided) is directed upward. The user A may hold the left controller 3 in this manner while putting the index finger at such a position at which the index finger may press the ZL button 39, and move, so as to protrude forward, his/her hand holding the left controller 3 (e.g., right hand). Thus, the user A may make an operation of pressing the ZL button 39 while directing, in the forward direction, an end in the longer direction of the left controller 3.

As described above, in the exemplary embodiment, as shown in FIG. 9, the user B holds the right controller 4, which is longer in the up-down direction in FIG. 1 and is generally plate-shaped, with, for example, his/her right hand such that the left controller 3 is oriented as follows: an upward direction in the longer direction (upward direction in FIG. 1 (positive y-axis direction)) is directed forward, the side surface facing the main body apparatus 2 when the right controller 3 is attached to the main body apparatus 2 (side surface on which the slider 62 is provided) is directed leftward, and the main surface (surface on which the analog stick 52 and the like are provided) is directed upward. The user B may hold the right controller 4 in this manner while putting the index finger at such a position at which the index finger may press the ZR button 61, and move, so as to protrude forward, his/her hand holding the right controller 4 (e.g., right hand). Thus, the user B may make an operation of pressing the ZR button 61 while directing, in the forward direction, an end in the longer direction of the right controller 3. In this manner, the left controller 3 or the right controller 4 is moved upward, downward, leftward, rightward, forward or rearward, rotated or swung while being held, so that a game play may be performed in accordance with the motion or the attitude of the left controller 3 or the right controller 4.

For easier understanding of the direction of acceleration or angular velocity caused in the left controller 3, the following directions will be defined for the left controller 3. The rightward direction in the above-described held state (direction from the rounded side surface toward the side surface attachable to the main body apparatus 2; the negative x-axis direction shown in FIG. 1) will be referred to as a "positive X-axis direction". The upward direction in the above-described held state (direction from the rear surface toward the main surface; the negative z-axis direction shown in FIG. 1) will be referred to as a "positive Y-axis direction". The forward direction in the above-described held state (upward direction in the longer direction; the positive y-axis direction shown in FIG. 1) will be referred to as a "positive Z-axis direction". The acceleration sensor 104 of the left controller 3 is capable of detecting an acceleration in each of the X-, Y- and Z-axis directions. The angular velocity sensor 105 is capable of detecting an angular velocity about each of the X-, Y- and Z-axis directions. For easier understanding of the direction of acceleration or angular velocity caused in the right controller 4, the following directions will be defined for the right controller 4. The rightward direction in the above-described held state (direction from the side surface attachable to the main body apparatus 2 toward the rounded side surface; the negative x-axis direction shown in FIG. 1) will be referred to as a "positive X-axis direction". The upward direction in the above-described held state (direction from the rear surface toward the main surface; the negative z-axis direction shown in FIG. 1) will be referred to as a "positive Y-axis direction". The forward direction in the above-described held state (upward direction in the longer direction; the positive y-axis direction shown in FIG. 1) will be referred to as a "positive Z-axis direction". The acceleration sensor 114 of the right controller 4 is capable of detecting an acceleration in each of the X-, Y- and Z-axis directions. The angular velocity sensor 115 is capable of detecting an angular velocity about each of the X-, Y- and Z-axis directions.

Figure 10:
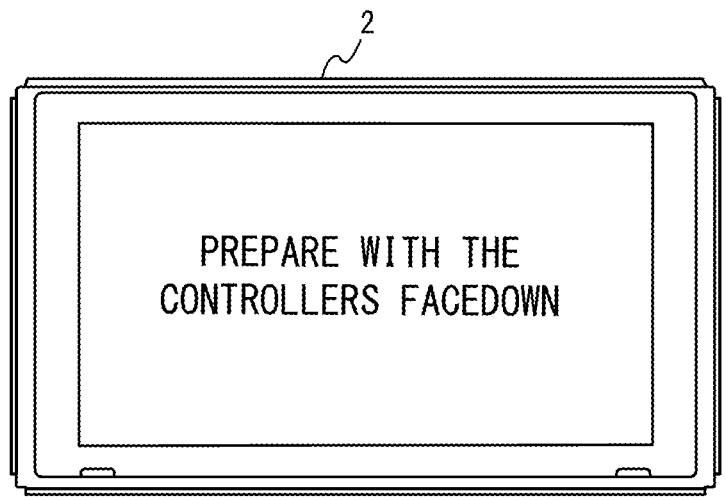
FIG. 10 shows a non-limiting example of game image displayed in a game played by two users in which user A moves the left controller 3 and user B moves the right controller 4.
Figure 10:
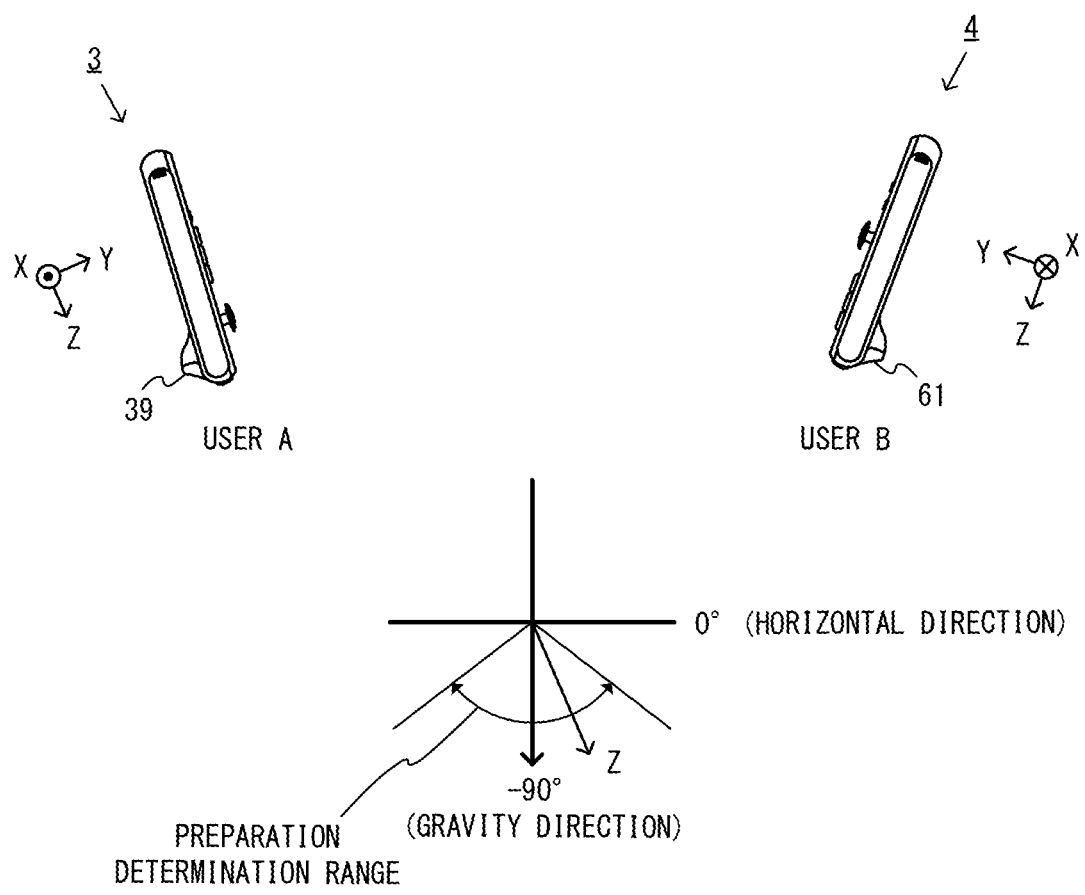
Figure 11:
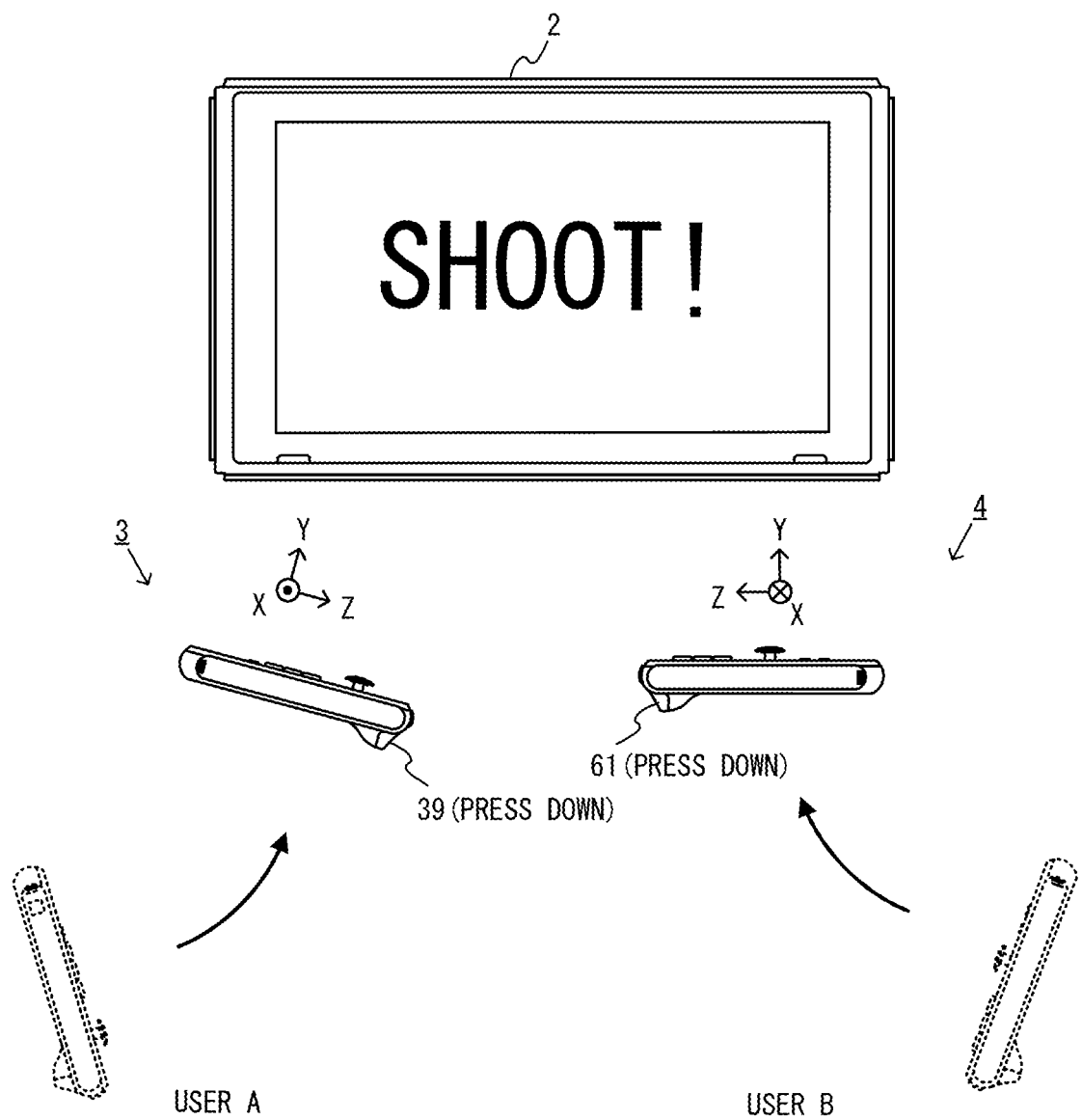
FIG. 11 shows a non-limiting example of game image displayed in a game played by two users in which the user A moves the left controller 3 and the user B moves the right controller 4.
Figure 12:
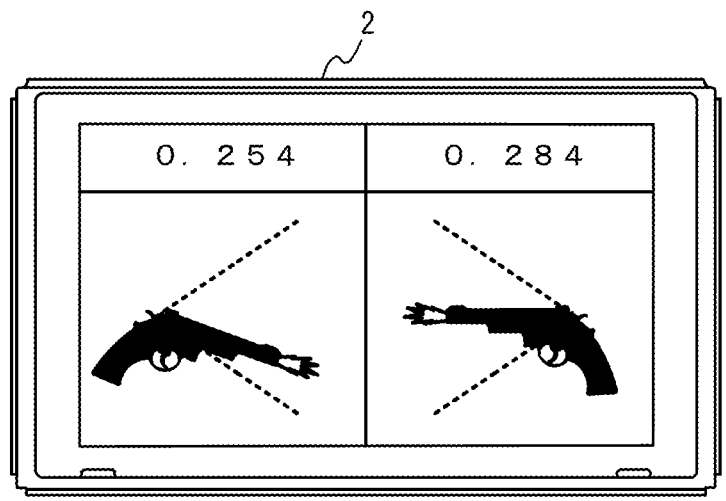
FIG. 12 shows a non-limiting example of game image displayed in a game played by two users in which the user A moves the left controller 3 and the user B moves the right controller 4.
Figure 12:
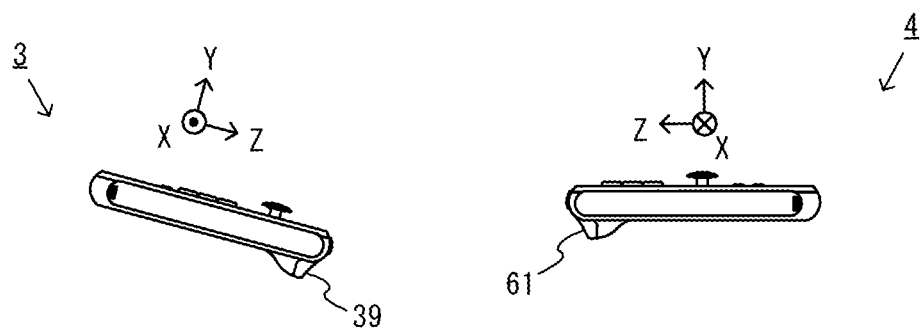
Figure 12:
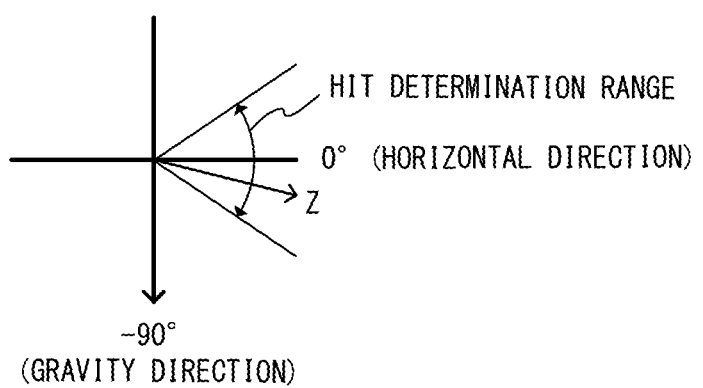

FIG. 10 through FIG. 12 each show an example of game image displayed in a game played by two users, more specifically, by the user A moving the left controller 3 and the user B moving the right controller 4. As shown in FIG. 10 through FIG. 12, in this game example, a game image in which the user A and the user B compete against each other on the shooting speed while respectively handling the left controller 3 and the right controller 4 as handguns is displayed on the main body apparatus 2 (display 12). The user A operating the left controller 3 and the user B operating the right controller 4 respectively press the operation buttons (e.g., ZL button 39 and ZR button 61) while swinging the left controller 3 and the right controller 4, so as to play the game of performing quick shooting (quick shooting game).

For example, as shown in FIG. 10, before the quick shooting game is started, an operation instruction for preparing for the start of the quick shooting game, namely, "PREPARE WITH THE CONTROLLERS FACEDOWN", is displayed on the main body apparatus 2 and a voice making this operation instruction is output from the main body apparatus 2. In response thereto, the user A and the user B respectively put the left controller 3 and the right controller 4 held by their hands facedown (namely, respectively hold the left controller 3 and the right controller 4 such that the positive Z-axis direction of the controllers is the downward direction in a real space). Thus, the start of the quick shooting game is prepared for. Specifically, in the exemplary embodiment, it is defined that the gravity direction in the real space is −90 degrees and the horizontal direction in the real space is 0 degrees. Regarding the angle of the positive Z-axis direction of each of the left controller 3 and the right controller 4 with respect to the horizontal direction and the gravity direction in the real space, a range smaller than −35 degrees is defined as a preparation determination range. When the angle of the Z-axis direction of each of the left controller 3 and the right controller 4 is included in the preparation determination range, the start of the quick shooting game using the left controller 3 and the right controller 4 is determined to be prepared for.

Next, as shown in FIG. 11, an operation instruction notifying that the quick shooting game is to be started, namely, "SHOOT !", is displayed on the main body apparatus 2 and a voice making this operation instruction is output from the main body apparatus 2. In response thereto, the user A and the user B respectively swing up the left controller 3 and the right controller 4 held by their hands toward the opponents (specifically, raise up the left controller 3 and the right controller 4 to the horizontal direction so as to direct the positive side in the Z-axis direction toward the opponent users in the real space), and make a predetermined operation (e.g., operation of pressing the ZL button 39 and the ZR button 61) at the timing when the left controller 3 and the right controller 4 are directed toward the opponent users. In this manner, a competition is made on which user shoots the opponent user first. Specifically, in the exemplary embodiment, the gravity direction in the real space is −90 degrees and the horizontal direction in the real space is 0 degrees. In a state where the angle of the positive Z-axis direction of the left controller 3 or the right controller 4 is in a range of −30 degrees or larger and smaller than 30 degrees, the left controller 3 or the right controller 4 is defined as being included in a hit determination range. In a case where the ZL button 39 or the ZR button 61 is pressed while the angle of the positive Z-axis direction of the left controller 3 or the right controller 4 is included in the hit determination range, the user A or the user B is determined to have made a valid shot toward the opponent user (shooting success determination). In a case where the ZL button 39 or the ZR button 61 is pressed while the left controller 3 or the right controller 4 is outside the hit determination range, or in a case where the ZL button 39 or the ZR button 61 is not pressed within an effective time period, the user A or the user B is determined to have made an invalid shot, which does not hit the opponent user (shooting failure determination).

As shown in FIG. 12, the results of the quick shooting game are displayed on the main body apparatus 2 and a voice informing which user is the winner is output from the main body apparatus 2. In the quick shooting game, the user who made a shot determined to be valid at an earlier timing, namely, the user who pressed the ZL button 39 or the ZR button 61 at an earlier timing, is the winner. In the example shown in FIG. 12, a shoot time period of the user A from the notification of the start of the quick shooting game until the user A made the valid shot is 0.254 second. The shoot time period of the user B is 0.284 seconds. The user A made the valid shot at an earlier timing, and thus is shown as the winner. In the example of game screen shown in FIG. 12, the attitudes of the left controller 3 and the right controller 4 at the time when the respective users made the valid shots are shown together with the shoot time periods. Specifically, the positive Z-axis directions of the left controller 3 and the right controller 4 are each set as the shooting direction of corresponding handgun objects. The handgun objects are each displayed so as to show the angles of the positive Z-axis directions with respect to the vertical direction in the real space at the time of the valid shot made by the left controller 3 or the right controller 4.

Figure 13:
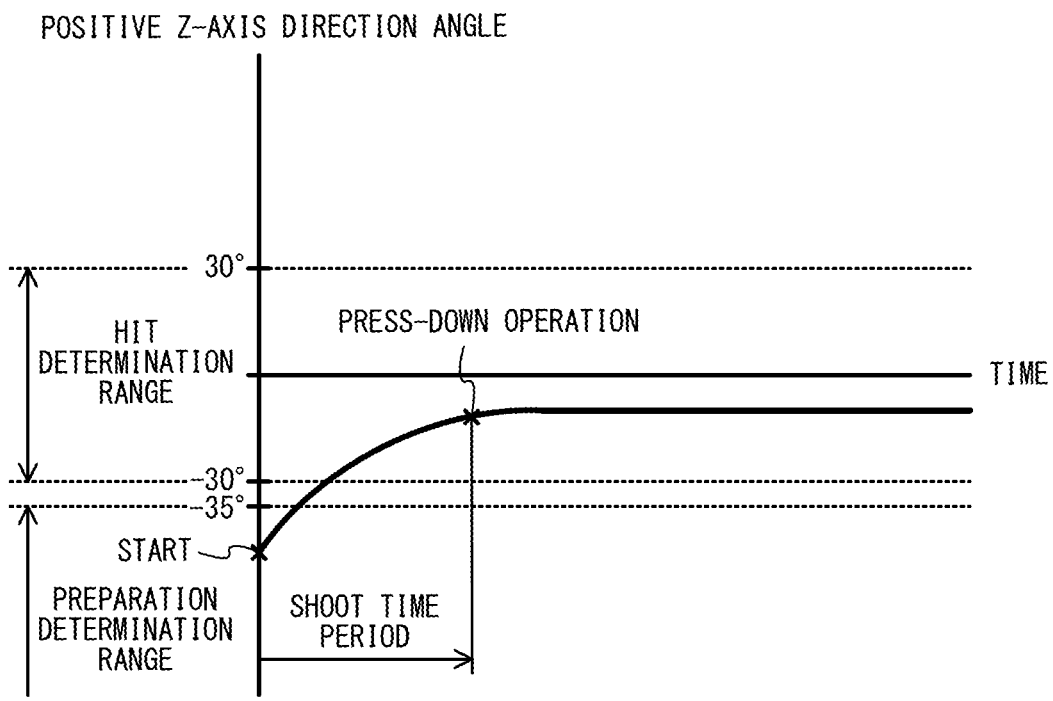
FIG. 13 is a graph showing a non-limiting first example in which a shot is determined to be valid in a quick shooting game.
Figure 14:
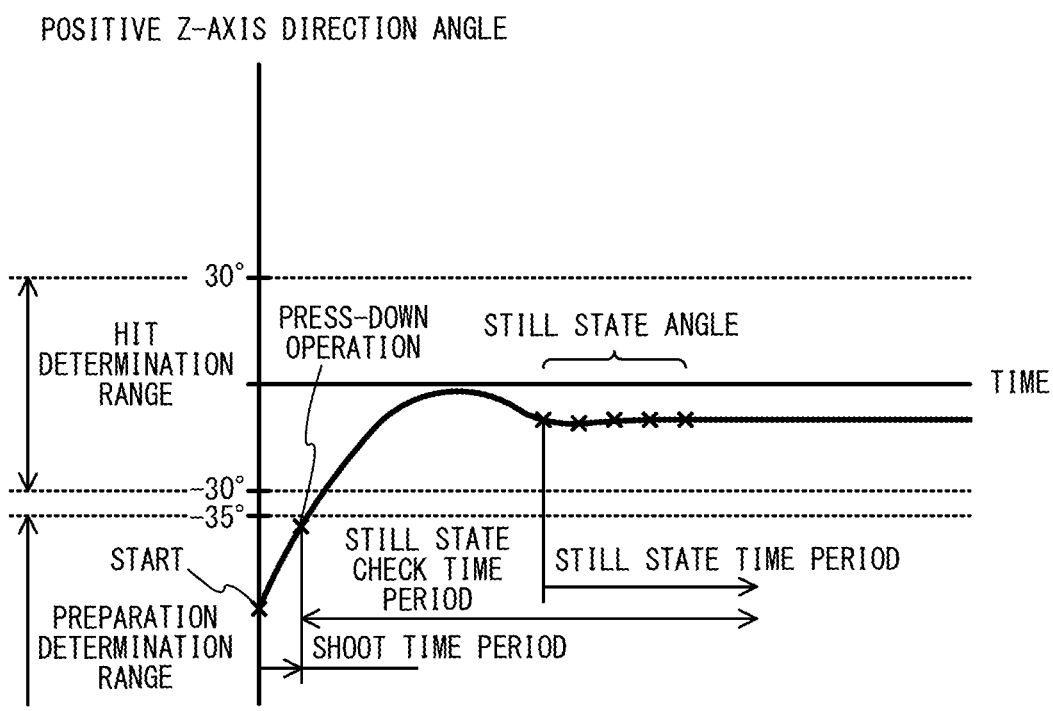
FIG. 14 is a graph showing a non-limiting second example in which a shot is determined to be valid in a quick shooting game.

Now, with reference to FIG. 13 and FIG. 14, a shoot determination result in the quick shooting game will be described in detail. FIG. 13 is a graph showing a first example in which a shot is determined to be valid in the quick shooting game. FIG. 14 is a graph showing a second example in which a shot is determined to be valid in the quick shooting game.

In the graph shown in FIG. 13, the horizontal axis represents the time, and the vertical axis represents the angle of the positive Z-axis direction (angle showing the positive Z-axis direction where the horizontal direction in the real space is 0 degrees and the vertical direction in the real space is −90 degrees). In order to make a determination on the attitude of the left controller 3 or the right controller 4 (in the following description, referred to simply as the "controller"), the preparation determination range and the hit determination range are set. For example, the preparation determination range is set to be smaller than −35 degrees for the positive Z-axis direction. For example, the hit determination range is set to −30 degrees or larger and smaller than 30 degrees for the positive Z-axis direction.

As described above, the start of the quick shooting game is determined to be prepared for when the attitude of the controller (angle of the positive Z-axis direction) is included in the preparation determination range. From the state where the attitude of the controller is included in the preparation determination range, the quick shooting game is started (the "start" point in FIG. 13).

When the quick shooting game is started, the user swings up the controller held by his/her hand such that the controller is directed toward the opponent user. Therefore, the angle of the positive Z-axis direction is increased from the "start" point toward 0 degrees, which corresponds to the horizontal direction in the real space. When the angle of the positive Z-axis direction reaches the angle at which the controller is directed toward the opponent user, the user makes a shoot operation (operation of pressing the ZL button 39 or the ZR button 61; the "press-down operation" point in FIG. 13). In a case where the angle of the positive Z-axis direction of the controller at the time of the shoot operation is included in the hit determination range, the shoot operation is valid. The time period from the "start" point until the "press-down operation" point is the shoot time period of the valid shoot operation. The angle of the positive Z-axis direction at the "press-down operation" point is a shoot direction (hit angle) of the valid shoot operation. As described above, in the first example in which a shot is determined to be valid in the quick shooting game, the game is started from the state where the attitude of the controller is included in the preparation determination angle, which is set to be outside the hit determination range, and in a case where the attitude of the controller is included in the hit determination range at the timing of a predetermined shoot operation, the shoot operation is determined to be valid.

In the graph shown in FIG. 14 also, the horizontal axis represents the time, and the vertical axis represents the angle of the positive Z-axis direction. In the second example in which a shot is determined to be valid in the quick shooting game, the preparation determination range and the hit determination range are set as in the first example. In the second example also, the start of the quick shooting game is determined to be prepared for when the attitude of the controller is included in the preparation determination range. The quick shooting game is started from the attitude at which the positive Z-axis direction of the controller is included in the preparation determination range (the "start" point in FIG. 14).

When the quick shooting game is started, the user swings up the controller held by his/her hand such that the controller is directed toward the opponent user. Therefore, the angle of the positive Z-axis direction is increased from the "start" point toward 0 degrees, which corresponds to the horizontal direction in the real space. In a shoot operation determination in the first example, if the user makes a shoot operation before the attitude of the controller is put into the hit determination range, the shoot operation is determined to have failed (determined to have missed). By contrast, in the shoot operation determination in the second example, there may be a case where if a shoot operation is made while the attitude of the controller is outside the hit determination range, the shoot operation is determined to be valid. For example, in the second example, even if a shoot operation is made while the positive Z-axis direction of the controller is directed downward with respect to the attitude of the controller included in the hit determination range in the real space, the shoot operation is determined to be successful in a case where the attitude of the controller is included in the hit determination range when the controller is put into a still state or a state of moving by a predetermined amount or less after the shoot operation. In the exemplary embodiment, the case where "a shoot operation is made while the positive Z-axis direction of the controller is directed downward" may be a case where a shoot operation is made while the attitude of the controller is included in the preparation determination range, or a case where a shoot operation is made while the attitude of the controller is between the hit determination range and the preparation determination range.

For example, referring to FIG. 14, a case where a user makes a shoot operation in a state where the positive Z-axis direction of the controller is directed downward with respect to the attitude of the controller in the hit determination range (in a state where the attitude of the controller is included in a depression-side range with respect to the hit determination range; the "press-down operation" point in FIG. 14) will be discussed. In this case, a still state check time period, in which it is checked whether or not the controller is in a still state after the shoot operation (e.g., time period until 20 frames lapse after the shoot operation) is set. In a case where within the still state check time period, the controller is put into the still state or a state equivalent to the still state (e.g., state where the motion of the controller is of a predetermined amount or less; more specifically, the motion of the positive side in the Z-axis direction of the controller is ±10 degrees) and the attitude of the controller in this state is included in the hit determination range, the shoot operation is determined to be valid ("still state time period" in FIG. 14). In the second example in which a shot is determined to be valid in the quick shooting game, the time period from the "start" point until the "press-down operation" point is the shoot time period of the valid shoot operation. As described above, in the second example in which a shot is determined to be valid in the quick shooting game, the quick shooting game is started from the state where the attitude of the controller is included in the preparation determination range, which is set to be outside the hit determination range. In a case where the attitude of the controller is outside the hit determination range at the timing when a predetermined shoot operation is made, the shoot operation is determined to be successful in a case where within the still state check time period, which starts from the timing of the shoot operation, the attitude of the controller is included in the hit determination range, and further the controller is put into the still state or the state of moving by a predetermined amount or less.

It is conceivable that in the second example in which a shot is determined to be valid in the quick shooting game, if the angle of the positive Z-axis direction at the "press-down operation" point is presented to the user as the shoot direction (hit angle) of the shoot operation determined to be valid, such a shoot result may not appear to be correct. Therefore, in the exemplary embodiment, the shoot direction (hit angle) in the second example is randomly selected from numerical values included in the hit determination range. In the second example described above, the angle of the positive Z-axis direction of a representative point in the "still state time period" (e.g., the average value, minimum value, maximum value, or the like of the angle of the positive Z-axis direction in the still state time period) may be set as the shoot direction (hit angle) of the shoot operation determined to be valid.

In the second example in which a shot is determined to be valid in the quick shooting game, a still attitude determination range, in which the controller is determined to be in the still state or the state of moving by a predetermined amount or less, may be obtained by a change from the hit determination range. In an example, the still attitude determination range may be set to a range narrower than the hit determination range (e.g., range of −20 degrees or larger and smaller than 20 degrees for the positive Z-axis direction). In another example, the still attitude determination range may be set to a range including a part of the hit determination range and a part of a range outside the hit determination range. In still another example, the still attitude determination range may be set to be equal to, narrower than, or wider than, the hit determination range.

Now, with reference to FIG. 15 through FIG. 18, an example of process executed by the information processing system 1 in the exemplary embodiment will be described. FIG. 15 shows an example of data area set in the DRAM 85 of the main body apparatus 2 in the exemplary embodiment. In the DRAM 85, data used in another process is stored in addition to the data shown in FIG. 15. Such data used in another process will not be described in detail.

In a program storage area of the DRAM 85, various programs Pa executable by the information processing system 1 is stored. In the exemplary embodiment, the various programs Pa include a communication program usable for wireless communication with the left controller 3 or the right controller 4 described above, an application program usable to perform an information process (e.g., game process) based on data acquired from the left controller 3 and/or the right controller 4, and the like. The various programs Pa may be stored on the flash memory 84 in advance, may be acquired from a storage medium attachable to, or detachable from, the information processing system 1 (e.g., the first type storage medium attached to the first slot 23 or the second type storage medium attached to the second slot 24) and stored on the DRAM 85, or may be acquired from another apparatus via a network such as the Internet or the like and stored on the DRAM 85. The CPU 81 executes the various programs Pa stored on the DRAM 85.

In a data storage area of the DRAM 85, various types of data usable for a communication process, an information process or the like executable by the information processing system 1 are stored. In the exemplary embodiment, operation data Da, attitude data Db, angular velocity data Dc, acceleration data Dd, left controller data De, right controller data Df, image data Dg and the like are stored.

The operation data Da is operation data appropriately acquired from the left controller 3 and the right controller 4. As described above, the operation data transmitted from each of the left controller 3 and the right controller 4 includes information regarding inputs from the input sections (specifically, the buttons, the analog sticks, and the sensors) (the information regarding the inputs specifically include information on the operations and detection results provided by the sensors). In the exemplary embodiment, the operation data is transmitted from the left controller 3 and the right controller 4 at a predetermined cycle via wireless communication, and the operation data Da is appropriately updated using the received operation data. The operation data Da may be updated every frame, which is a cycle of the process executed by the information processing system 1 as described below, or may be updated every cycle by which the operation data is transmitted via the above-described wireless communication.

The attitude data Db represents an attitude of each of the left controller 3 and the right controller 4 with respect to the direction of the gravitational acceleration in the real space. For example, the attitude data Db includes, for example, data representing the direction of the gravitational acceleration acting on each of the left controller 3 and the right controller 4, data representing the X-, Y- and Z-axis directions with respect to the gravitational acceleration direction, and the like.

The angular velocity data Dc represents an angular velocity caused in each of the left controller 3 and the right controller 4. For example, the angular velocity data Dc includes data representing the angular velocity about the X, Y- and Z axes caused in each of the left controller 3 and the right controller 4.

The acceleration data Dd represents an acceleration caused in each of the left controller 3 and the right controller 4. For example, the acceleration data Dd includes data representing the acceleration caused in each of the left controller 3 and the right controller 4 in each of the X-, Y- and Z-axis directions excluding the gravitational acceleration.

The left controller data De is regarding the motion, attitude, operation state and the like of the left controller 3. The left controller data De includes press-down flag data De1, hit/non-hit determination result data De2, shoot time period data De3, shoot angle data De4 and still state time period data De5. The press-down flag data De1 represents a press-down flag, which is set to ON when the user makes a shoot operation in a state where the positive Z-axis direction of the left controller 3 is directed downward with respect to the attitude of the left controller 3 included in the hit determination range in the real space. The hit/non-hit determination result data De2 indicates whether a valid shoot operation (operation of hitting the opponent user) has been made by use of the left controller 3, an invalid operation (operation of missing the opponent user, operation not performed within the effective time period, etc.) has been made by use of the left controller 3, or no shoot operation has been made. The shoot time period data De3 represents the shoot time period in which the shoot operation is made by use of the left controller 3. The shoot angle data De4 represents the shoot direction of the left controller 3 at the time of the shoot operation ("hit angle" when the shoot operation hits the opponent user, and "miss angle" when the shoot operation misses the opponent user). The still state time period data De5 represents the time period in which the state where the motion of the left controller 3 is the predetermined amount or less is kept (namely, represents the still time period).

The right controller data Df is regarding the motion, attitude, operation state and the like of the right controller 4. The right controller data Df includes press-down flag data Df1, hit/non-hit determination result data Df2, shoot time period data Df3, shoot angle data Df4 and still state time period data Df5. The press-down flag data Df1 represents a press-down flag, which is set to ON when the user makes a shoot operation in a state where the positive Z-axis direction of the right controller 4 is directed downward with respect to the attitude of the right controller 4 included in the hit determination range in the real space. The hit/non-hit determination result data Df2 indicates whether a valid shoot operation (operation of hitting the opponent user) has been made by use of the right controller 4, an invalid operation (operation of missing the opponent user, operation not performed within the effective time period, etc.) has been made by use of the right controller 4, or no shoot operation has been made. The shoot time period data Df3 represents the shoot time period in which the shoot operation is made by use of the right controller 4. The shoot angle data Df4 represents the shoot direction of the right controller 4 at the time of the shoot operation ("hit angle" when the shoot operation hits the opponent user, and "miss angle" when the shoot operation misses the opponent user). The still state time period data Df5 represents the time period in which the state where the motion of the right controller 4 is the predetermined amount or less is kept (namely, represents the still time period).

The image data Dg is usable to display an image (e.g., an image of a virtual object, an image of the results of the shoot operation, or an image of the background) on the display 12 of the main body apparatus 2 during the game.

Figure 16:
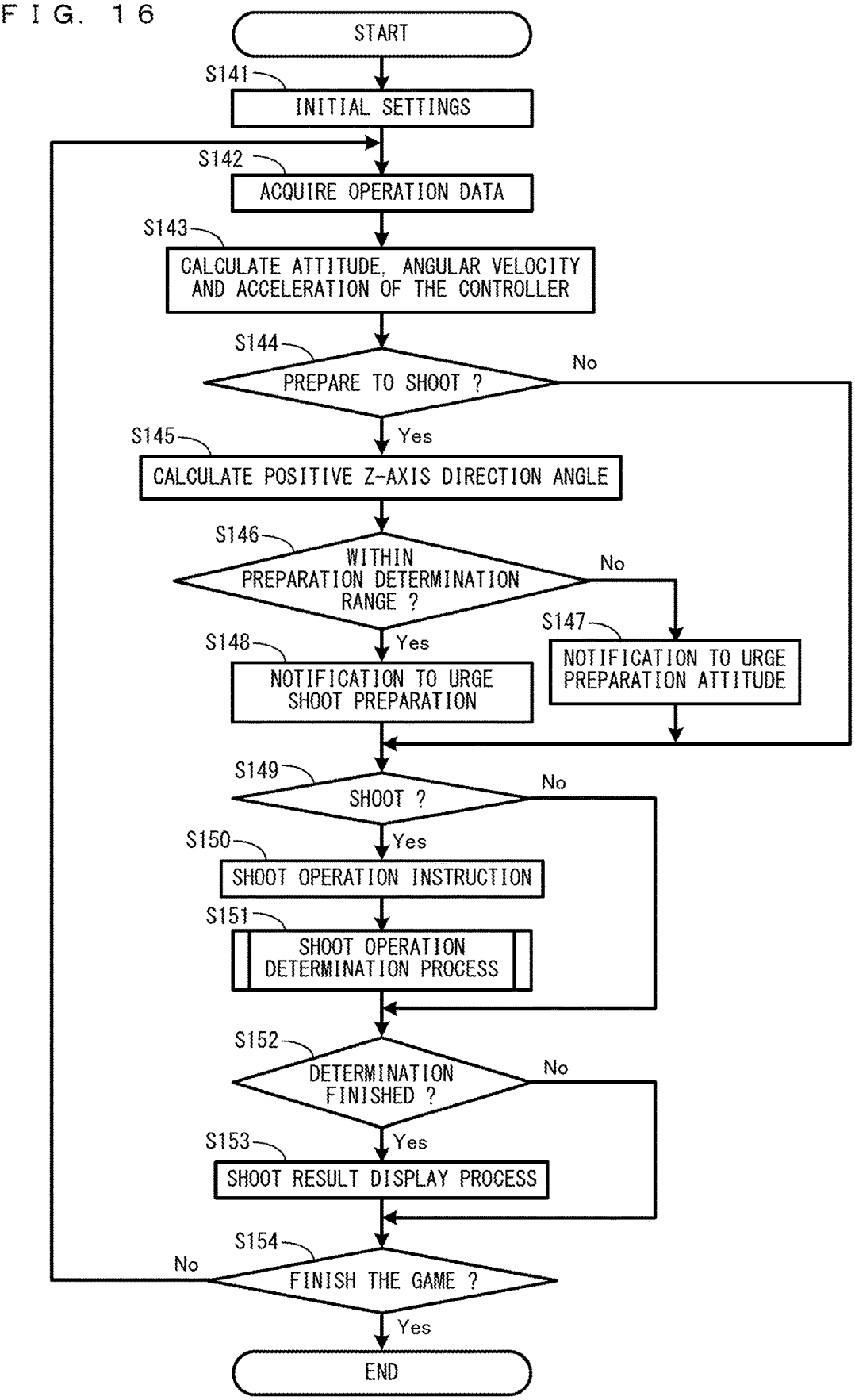
FIG. 16 is a flowchart showing a non-limiting example of game process executable by the information processing system 1.
Figure 17:
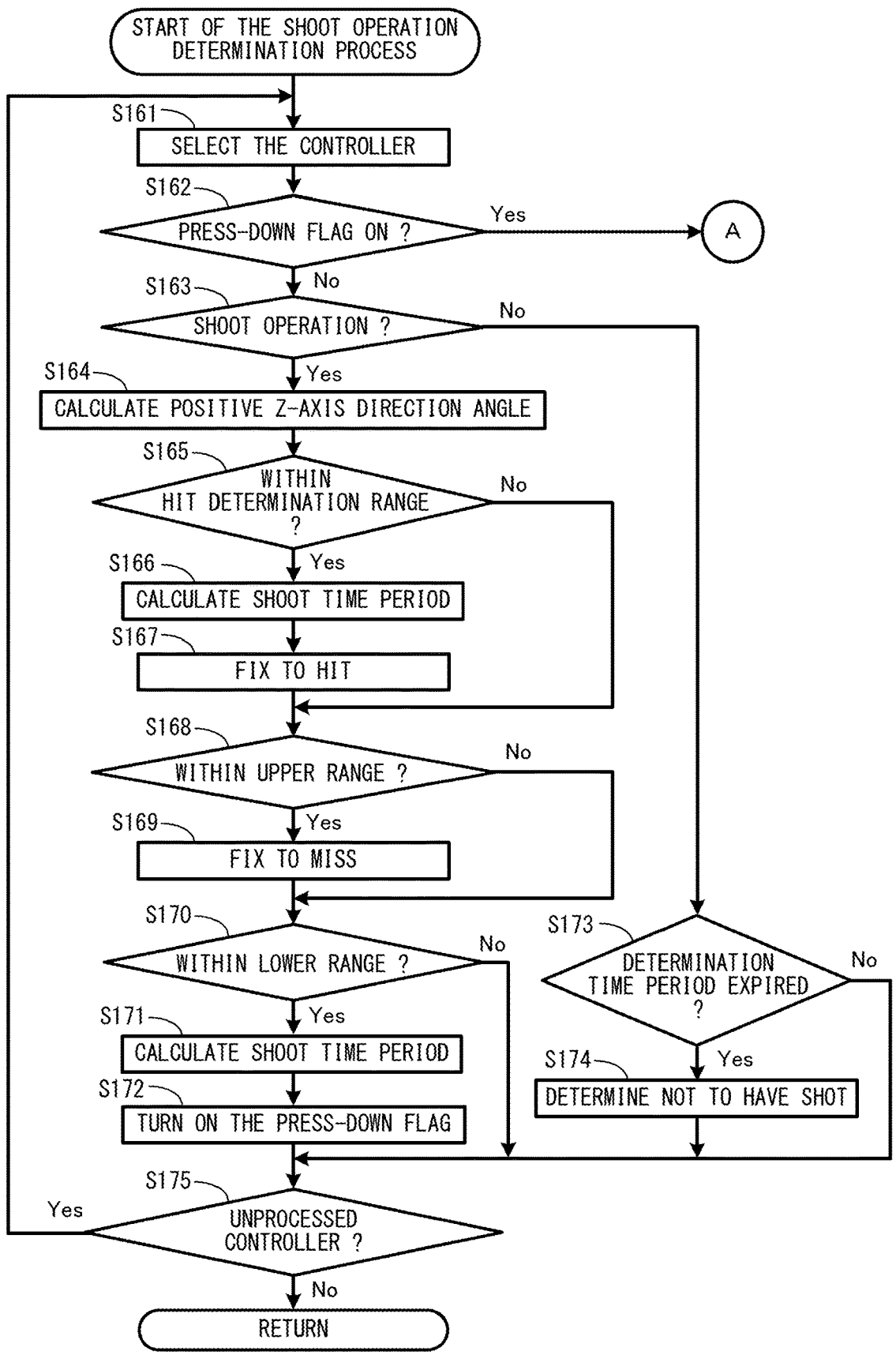
FIG. 17 shows a non-limiting example of sub routine representing details of a shoot operation determination process executed in step S151 shown in FIG. 16.
Figure 18:
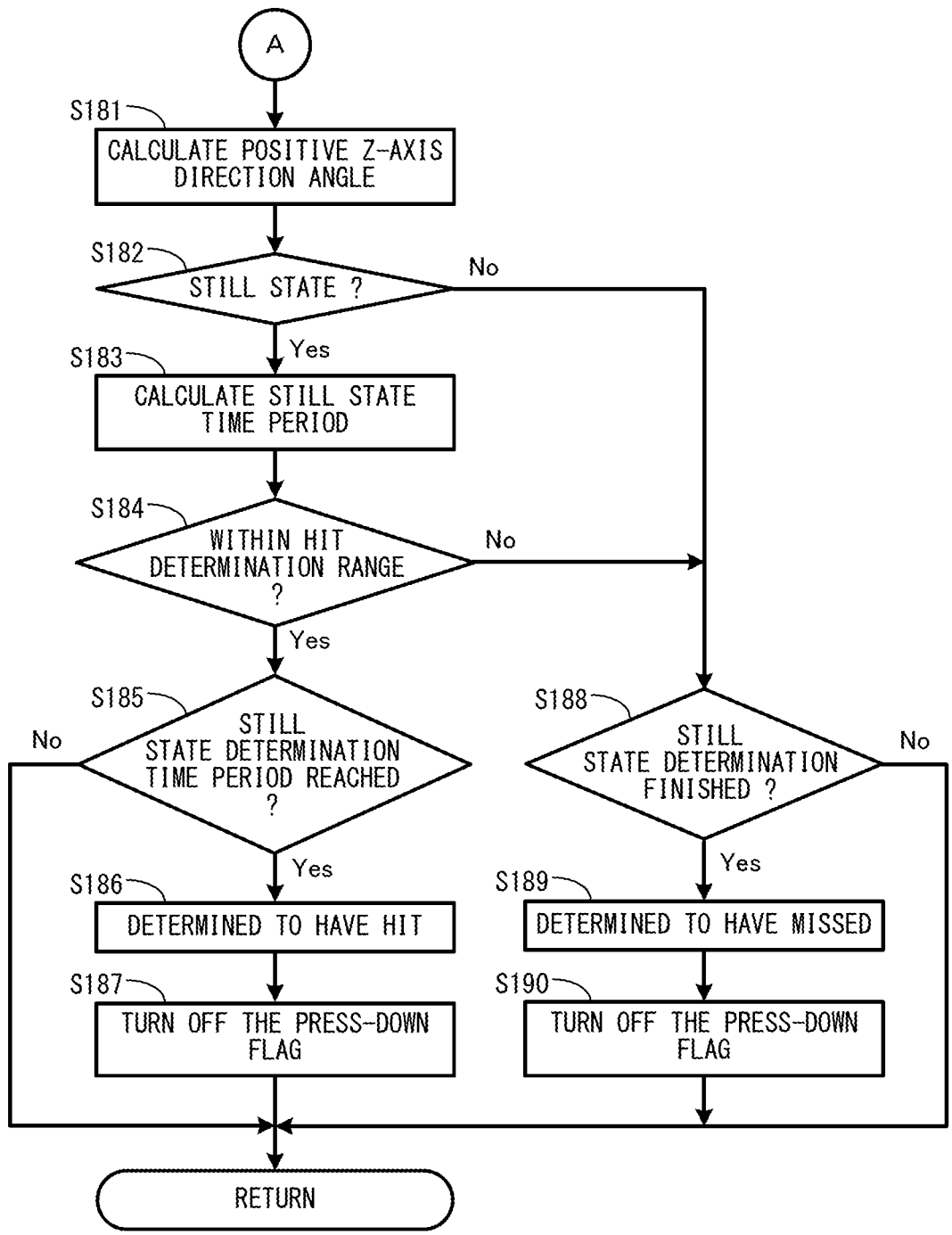
FIG. 18 shows a non-limiting example of sub routine representing details of the shoot operation determination process executed in step S151 shown in FIG. 16.

Now, an example of information process (game process) in the exemplary embodiment will be described in detail. FIG. 16 is a flowchart showing an example of game process executed by the information processing system 1. FIG. 17 and FIG. 18 each provide a flowchart showing, in detail, a sub routine of a shoot operation determination process executed in step S151 in FIG. 16. In the exemplary embodiment, the series of processes shown in FIG. 16 through FIG. 18 is executed by the CPU 81 executing a communication program and a predetermined application program (game program) included in the various programs Pa. The timing to start the game process shown in FIG. 16 through FIG. 18 is optional.

The process in each of the steps shown in FIG. 16 through FIG. 18 is merely illustrative, and the order of the processes executed in the steps may be changed as long as substantially the same result is obtained. Another process may be executed in addition to (or instead of) the processes executed in the steps. In the exemplary embodiment, the process in each of the steps will be described as being executed by the CPU 81. A part of the processes in the steps may be executed by a processor other than the CPU 81 or a dedicated circuit. A part of the processes executed by the main body apparatus 2 may be executed by another information processing apparatus communicable with the main body apparatus 2 (e.g., server communicable with the main body apparatus 2 via a network). Namely, the processes shown in FIG. 16 through FIG. 18 may be executed by cooperation of a plurality of information processing apparatuses including the main body apparatus 2.

Referring to FIG. 16, the CPU 81 performs initial settings for the game process (step S141) and advances the game process to step S142. For example, in the initial settings, the CPU 81 initializes parameters usable to perform the processes described below.

Next, the CPU 81 acquires the operation data from the left controller 3 and the right controller 4 to update the operation data Da (step S142), and advances the game process to step S143.

Next, the CPU 81 calculates the attitude, the angular velocity, and the acceleration of each of the left controller 3 and the right controller 4 (step S143), and advances the game process to step S144. For example, the CPU 81 acquires, from the operation data Da, data representing the acceleration caused in each of the left controller 3 and the right controller 4, calculates the direction of the gravitational acceleration acting on each of the left controller 3 and the right controller 4, and updates the attitude data Db by use of the data representing the direction. The gravitational acceleration may be extracted by any method. For example, an acceleration component caused, on average, in each of the left controller 3 and the right controller 4 may be calculated and extracted as the gravitational acceleration. The CPU 81 calculates, as the attitude of the left controller 3, the X-, Y- and Z-axis directions of the left controller 3 with respect to the direction of the gravitational acceleration calculated regarding the left controller 3, and updates the attitude data Db by use of the data representing the attitude. The CPU 81 calculates, as the attitude of the right controller 4, the X-, Y- and Z-axis directions of the right controller 4 with respect to the direction of the gravitational acceleration calculated regarding the right controller 4, and updates the attitude data Db by use of the data representing the attitude. The CPU 81 acquires, from the operation data Da, data representing the angular velocity caused in each of the left controller 3 and the right controller 4, calculates the angular velocity of each of the left controller 3 and the right controller 4 about each of the X, Y and Z axes, and updates the angular velocity data Dc by use of the data representing the angular velocity. The CPU 81 acquires, from the operation data Da, data representing the acceleration caused in each of the left controller 3 and the right controller 4, deletes the above-mentioned gravitational acceleration component from the acceleration caused in each of the left controller 3 and the right controller 4 in the X-, Y- and Z-axis directions, and updates the acceleration data Dd by use of the data representing the post-deletion acceleration.

After the X-, Y- and Z-axis directions with respect to the gravitational acceleration are calculated, the attitude of each of the left controller 3 and the right controller 4 may be updated only in accordance with the angular velocity about each of the X, Y and Z axes. Alternatively, in order to prevent a situation where the relationship between the attitude of each of the left controller 3 and the right controller 4 and the gravitational acceleration direction is shifted as a result of errors being accumulated, the X-, Y- and Z-axis directions with respect to the gravitational acceleration direction may be calculated at each predetermined cycle to correct the attitude of each of the left controller 3 and the right controller 4.

Next, the CPU 81 determines whether or not the current time is in a preparation time period for shooting in the quick shoot game (step S144). When the current time is in the preparation time period for shooting, the CPU 81 advances the game process to step S145. By contrast, the when the current time is not in the preparation time period for shooting, the CPU 81 advances the game process to step S149.

In step S145, the CPU 81 calculates the angle of the positive Z-axis direction of each of the left controller 3 and the right controller 4, and advances the game process to step S146. For example, the CPU 81 refers to the attitude data Db to acquire the angle of the positive Z-axis direction of the left controller 3 with respect to the gravitational acceleration direction, and calculates, as the angle of the positive Z-axis direction of the left controller 3, the angle of difference of the positive Z-axis direction with respect to the horizontal direction in the real space (an elevation angle is set to a positive value and a depression angle is set to have a negative value). The CPU 81 refers to the attitude data Db to acquire the angle of the positive Z-axis direction of the right controller 4 with respect to the gravitational acceleration direction, and calculates, as the angle of the positive Z-axis direction of the right controller 4, the angle of difference of the positive Z-axis direction with respect to the horizontal direction in the real space (an elevation angle is set to a positive value and a depression angle is set to have a negative value).

Next, the CPU 81 determines whether or not the attitudes of both of the left controller 3 and the right controller 4 are included in a preset preparation determination range (step S146). For example, when the angles of the positive Z-axis directions of both of the left controller 3 and the right controller 4 calculated in step S145 are included in a preset preparation determination range (range of smaller than −35 degrees), the CPU 81 provides a positive determination result in step S146. When the attitude of at least one of the left controller 3 or the right controller 4 is not included in the preparation determination range, the CPU 81 advances the game process to step S147. When the attitudes of both of the left controller 3 and the right controller 4 are included in the preparation determination range, the CPU 81 advances the game process to step S148.

In step S147, the CPU 81 makes a notification that urges the users to put the left controller 3 and the right controller 4 into a preparation attitude, and advances the game process to step S149. For example, the CPU 81 displays the operation instruction for preparing for the start of the quick shooting game, for example, "PREPARE WITH THE CON- TROLLERS FACEDOWN", on the main body apparatus 2 and outputs a voice making this operation instruction from the main body apparatus 2 (see FIG. 10). In this manner, the CPU 81 makes a notification that urges the users to put the left controller 3 and the right controller 4 into the preparation attitude.

In step S148, the CPU 81 makes a notification that urges the users to get ready for shooting by use of the left controller 3 and the right controller 4, and advances the game process to step S149. For example, the CPU 81 makes a notification that indicates that the timing to make a shoot operation is coming soon, for example, "READY!", on the main body apparatus 2 and outputs a voice making this notification from the main body apparatus 2. In this manner, the CPU 81 makes a notification that urges the users to get ready for shooting.

In a case where, within the preparation time period for shooting in the quick shoot game, a user makes a shoot operation by use of the left controller 3 or the right controller 4, the user is determined to be disqualified for making a false start. In this case, an image showing that the user made the false start may be displayed on the main body apparatus 2 and then the preparation time period may be set again. Alternatively, it may be considered that shoot determination results are fixed as a result of the false start being made, and a shoot result display process in step S153 may be executed.

In step S149, the CPU 81 determines whether or not the current time is in the shoot time period, in which shooting is performed in the quick shoot game. When the current time is in the shoot time period, the CPU 81 advances the game process to step S150. By contrast, the when the current time is not in the shoot time period, the CPU 81 advances the game process to step S152.

In step S150, the CPU 81 makes a notification that urges the users to make a shoot operation by use of the left controller 3 and the right controller 4, and advances the game process to step S151. For example, the CPU 81 displays an operation instruction notifying the users that the quick shooting game is to be started, for example, "SHOOT!" on the main body apparatus 2 and outputs a voice making this operation instruction from the main body apparatus 2 (see FIG. 11). In this manner, the CPU 81 makes a notification that urges the users to make a shoot operation by use of the left controller 3 and the right controller 4.

Next, the CPU 81 executes a shoot operation determination process (S151), and advances the game process to step S152. Hereinafter, with reference to FIG. 17 and FIG. 18, the shoot operation determination process in step S151 will be described.

Referring to FIG. 17, the CPU 81 selects a controller to be a target of the shoot operation determination process (S161), and advances the game process to step S162. For example, the CPU 81 selects a controller on which the shoot operation determination process has not been executed, and on which the shoot determination result has not been fixed, in the current processing frame (namely, the left controller 3 or the right controller 4), and sets the selected controller as a controller as a processing target of the subsequent processes.

Next, the CPU 81 determines whether or not the press-down flag is set to ON (step S162). For example, the CPU 81 refers to the press-down flag data De1 or Df1 corresponding to the controller as the processing target to determine whether or not the press-down flag is set to ON. When the press-down flag of the controller as the processing target is set to OFF, the CPU 81 advances the game process to step S163. By contrast, when the press-down flag of the controller as the processing target is set to ON, the CPU 81 advances the game process to step S181 (see FIG. 18).

In step S163, the CPU 81 determines whether or not the shoot operation has been made. For example, the CPU 81 refers to the operation data Da. When a predetermined operation (e.g., operation of pressing the ZL button 39 or the ZR button 61) has been made on the controller as the processing target, the CPU 81 provides a positive determination result in step S163. When the shoot operation has been made on the controller as the processing target, the CPU 81 advances the game process to step S164. By contrast, when the shoot operation has not been made on the controller as the processing target, the CPU 81 advances the game process to step S173.

In step S164, the CPU calculates the angle of the positive Z-axis direction of the controller as the processing target, and advances the game process to step S165. For example, the CPU 81 refers to the attitude data Db to acquire the positive Z-axis direction of the controller as the processing target with respect to the gravitational acceleration direction, and calculates, as the angle of the positive Z-axis direction of the controller as the processing target, the angle of difference of the positive Z-axis direction with respect to the horizontal direction in the real space (an elevation angle is set to a positive value and a depression angle is set to have a negative value).

Next, the CPU 81 determines whether or not the attitude of the controller as the processing target is included in the hit determination range (step S165). For example, when the angle of the positive Z-axis direction of the controller as the processing target calculated in step S164 is included in a preset hit determination range (e.g., range of −30 degrees or larger and smaller than 30 degrees), the CPU 81 provides a positive determination result in step S165. When the attitude of the controller as the processing target is included in the hit determination range, the CPU 81 advances the game process to step S166. By contrast, when the attitude of the controller as the processing target is not included in the hit determination range, the CPU 81 advances the game process to step S168.

In step S166, the CPU 81 calculates the shoot time period, and advances the game process to step S167. For example, the CPU 81 calculates, as the shoot time period, the time period from when the operation instruction for shooting is made in step S150 until the current time, and updates the shoot time period data De3 or Df3 of the controller as the processing target by use of the calculated shoot time period.

Next, the CPU 81 fixes the shoot determination result of the controller as the processing target to "hit" (step S167), and advances the game process to step S168. For example, the CPU 81 fixes the shoot determination result of the controller as the processing target to "hit" (the shoot operation is valid), and updates the hit/non-hit determination result data De2 or Df2 of the controller as the processing target by use of the shoot determination result. The CPU 81 also sets, as the "hit angle", the angle of the positive Z-axis direction calculated in step S164, and updates the shoot angle data De4 or Df4 of the controller as the processing target by use of the "hit angle".

In step S168, the CPU 81 determines whether or not the attitude of the controller as the processing target is included in an upper range. For example, when the angle of the positive Z-axis direction of the controller as the processing target calculated in step S164 is included in a preset upper range (the entirety of an elevation angle-side range with respect to the hit determination range; for example, a range of 30 degrees or larger for the positive Z-axis direction), the CPU 81 provides a positive determination result in step S168. When the attitude of the controller as the processing target is included in the upper range, the CPU 81 advances the game process to step S169. By contrast, when the attitude of the controller as the processing target is not included in the upper range, the CPU 81 advances the game process to step S170.

In step S169, the CPU 81 fixes the shoot determination result of the controller as the processing target to "miss", and advances the game process to step S170. For example, the CPU 81 fixes the shoot determination result of the controller as the processing target to "miss" (the shoot operation is invalid), and updates the hit/non-hit determination result data De2 or Df2 of the controller as the processing target by use of the shoot determination result. The CPU 81 also sets, as the "miss angle", the angle of the positive Z-axis direction calculated in step S164, and updates the shoot angle data De4 or Df4 of the controller as the processing target by use of the "miss angle".

In step S170, the CPU 81 determines whether or not the attitude of the controller as the processing target is included in a lower range. For example, when the angle of the positive Z-axis direction of the controller as the processing target calculated in step S164 is included in a preset lower range (the entirety of a depression angle-side range with respect to the hit determination range; for example, a range smaller than −30 degrees for the positive Z-axis direction), the CPU 81 provides a positive determination result in step S170. When the attitude of the controller as the processing target is included in the lower range, the CPU 81 advances the game process to step S171. By contrast, when the attitude of the controller as the processing target is not included in the lower range, the CPU 81 advances the game process to step S175.

In step S171, the CPU 81 calculates the shoot time period, and advances the game process to step S172. For example, the CPU 81 calculates, as the shoot time period, the time period from when the operation instruction for shooting is made in step S150 until the current time, and updates the shoot time period data De3 or Df3 of the controller as the processing target by use of the calculated shoot time period.

Next, the CPU 81 sets the press-down flag to ON (step S172), and advances the game process to step S175. For example, the CPU 81 sets the press-down flag of the controller as the processing target to ON, and updates the press-down flag data De1 or Df1 of the controller as the processing target.

When it is determined in step S163 that the shoot operation has not been made, the CPU 81 determines whether or not a determination time period has expired (step S173). For example, when the time period from when the operation instruction for shooting is made in step S150 until the current time reaches a predetermined determination time period, the CPU 81 determines that the determination time period has expired. When the determination time period has expired, the CPU 81 advances the game process to step S174. By contrast, when the determination time period has not expired, the CPU 81 advances the game process to step S175.

In step S174, the CPU 81 fixes the shoot determination result of the controller as the processing target to "no shoot operation", which indicates that no shoot operation has been made, and advances the game process to step S175. For example, the CPU 81 fixes the shoot determination result of the controller as the processing target to "no shoot operation", and updates the hit/non-hit determination result data De2 or Df2 of the controller as the processing target by use of the shoot determination result.

In step S175, the CPU 81 determines whether or not there is still a controller on which the shoot operation determination process has not been executed. For example, when there is still a controller on which the shoot operation determination process has not been executed, and on which the shoot determination result has not been fixed, in the current processing frame, the CPU 81 returns the game process to step S161 to execute the shoot operation determination process on another controller as a processing target. By contrast, when the shoot operation determination process has been executed, or the shoot determination result has been fixed, on all the controllers in the current processing frame, the CPU 81 finishes the process in this sub routine.

Referring to FIG. 18, when it is determined in step S162 that the press-down flag is set to ON, the CPU 81 calculates the angle of the positive Z-axis direction of the controller as the processing target (step S181), and advances the game process to step S182. The process in step S181 is substantially the same as that in step S164, and will not be described in detail here.

Next, the CPU 81 determines whether or not the controller as the processing target is in the still state (step S182). For example, when the angle of the positive Z-axis direction of the controller as the processing target calculated in step S181 in the current frame, and the angle of the positive Z-axis direction of the controller as the processing target calculated in step S181 in the immediately previous frame, are within a predetermined range (e.g., ±10 degrees), the CPU 81 determines that the controller as the processing target is in the still state. When the controller as the processing target is in the still state, the CPU 81 advances the game process to step S183. By contrast, when the controller as the processing target is not in the still state, the CPU 81 advances the game process to step S188.

In step S183, the CPU 81 calculates the still time period, and advances the game process to step S184. For example, the CPU 81 refers to the immediately previous history of the angle of the positive Z-axis direction of the controller as the processing target, and extracts continuous data pieces representing the angles of the positive Z-axis direction that are within a predetermined range (e.g., ±10 degrees). Such continuous data pieces are extracted backward from the current time. The CPU 81 sets the number of the extracted data pieces (number of frames) as the still state time period, and updates the still state time period data De5 or Df6 of the controller as the processing target by use of the set still state time period.

Next, the CPU 81 determines whether or not the attitude of the controller as the processing target in the still state is included in the hit determination range (step S184). For example, when the angles of the positive Z-axis direction included in the history, based on which the still state time period is calculated in step S183, are all included in the hit determination range, the CPU 81 provides a positive determination result in step S184. When the attitude of the controller as the processing target in the still state is included in the hit determination range, the CPU 81 advances the game process to step S185. By contrast, when the attitude of the controller as the processing target in the still state is not included in the hit determination range, the CPU 81 advances the game process to step S188.

In step S185, the CPU 81 determines whether or not a still state determination time period is reached. For example, when the still state time period calculated in step S183 reached a preset still state determination time period (e.g., 5 frames), the CPU 81 determines that the controller as the processing target has reached the still state determination time period. When the controller as the processing target has reached the still state determination time period, the CPU 81 advances the game process to step S186. By contrast, when the controller as the processing target has not reached the still state determination time period, the CPU 81 finishes the process in this sub routine.

In step S186, the CPU 81 fixes the shoot determination result of the controller as the processing target to "hit", and advances the game process to step S187. For example, the CPU 81 fixes the shoot determination result of the controller as the processing target to "hit" (the shoot operation is valid), and updates the hit/non-hit determination result data De2 or Df2 of the controller as the processing target by use of the shoot determination result. The CPU 81 also sets, as the "hit angle", a random value in the hit determination range, and updates the shoot angle data De4 or Df4 of the controller as the processing target by use of the "hit angle".

Next, the CPU 81 sets the press-down flag to OFF (step S187), and finishes the process in this sub routine. For example, the CPU 81 sets the press-down flag of the controller as the processing target to OFF, and updates the press-down flag data De1 or Df1 of the controller as the processing target.

When it is determined in step S182 that the controller as the processing target is not in the still state, or when it is determined in step S184 that the attitude of the controller as the processing target is not included in the hit determination range, the CPU 81 determines whether or not to finish the still state determination (step S188). For example, when the time period from when the press-down flag of the controller as the processing target is set to ON in step S172 until the current time is a predetermined still state determination period (e.g., 20 frames) or longer, the CPU 81 determines to finish the still state determination. When the still state determination is to be finished, the CPU 81 advances the game process to step S189. By contrast, when the still state determination is to be continued, the CPU 81 finishes the process in this sub routine.

In step S189, the CPU 81 fixes the shoot determination result of the controller as the processing target to "miss", and advances the game process to step S190. For example, the CPU 81 fixes the shoot determination result of the controller as the processing target to "miss" (the shoot operation is invalid), and updates the hit/non-hit determination result data De2 or Df2 of the controller as the processing target by use of the shoot determination result. The CPU 81 also sets, as the "miss angle", the angle of the positive Z-axis direction calculated in step S164 (i.e., the angle of the positive Z-axis direction at the time of the shoot operation), and updates the shoot angle data De4 or Df4 of the controller as the processing target by use of the "miss angle".

Next, the CPU 81 sets the press-down flag to OFF (step S190), and finishes the process in this sub routine. For example, the CPU 81 sets the press-down flag of the controller as the processing target to OFF, and updates the press-down flag data De1 or Dr1 of the controller as the processing target.

Returning to FIG. 16, in step S152, the CPU 81 determines whether or not the shoot operation determination process has been finished on all the controllers. For example, the CPU 81 refers to the hit/non-hit determination result data De2 and Df2. When the shoot determination results have been fixed on both of the left controller 3 and the right controller 4, the CPU 81 provides a positive determination result in step S152. When the shoot operation determination process has been finished on all the controllers, the CPU 81 advances the game process to step S153. By contrast, when the shoot operation determination process has not been finished on all the controllers, the CPU advances the game process to step S154.

In step S153, the CPU 81 executes a process of displaying the shoot results, and advances the game process to step S154. For example, the CPU 81 compares the hit/non-hit determination result data De2 and the shoot time period data De3 of the left controller data De, and the hit/non-hit determination result data Df2 and the shoot time period data Df3 of the right controller data Df, against each other, and determines, as the winner, either the left controller 3 or the right controller 4 which made a shoot operation determined as being "hit" within a shorter shoot time period. The CPU 81 displays an image showing which is the winner on the main body apparatus 2 and outputs a voice informing which is the winner from the main body apparatus 2. Based on the shoot time period data De3 of the left controller data De and the shoot time period data Df3 of the right controller data Df, the CPU 81 displays an image of letters showing the shoot time period of each of the users on the main body apparatus 2. Based on the shoot angle data De4 of the left controller data De and the shoot angle data Df4 of the right controller data Df, the CPU 81 displays an image of handgun objects showing the "hit angles" on the main body apparatus 2 (see FIG. 12). In a case where the shoot determination results are fixed because either user is determined to have made a false start in the preparation time period, an image showing that the user who made a false start is disqualified may be displayed on the main body apparatus 2 and a voice informing that the user who made the false start may be output from the main body apparatus 2.

In step S154, the CPU 81 determines whether or not to finish the game. A condition under which the game is to be finished in step S154 is, for example, that the time period for displaying the shoot results has expired, or that the user has made an operation of finishing the game. When determining not to finish the game, the CPU 81 returns the game process to step S142 to repeat the above-described processes. When determining to finish the game, the CPU 81 finishes the process in this flowchart. The series of processes in steps S142 through S154 are repeated until it is determined to finish the game in step S154.

As described above, in the exemplary embodiment, a predetermined instruction operation is determined to be successful in accordance with the attitudes of the left controller 3 and the right controller 4 and the manner of the predetermined instruction operation made by use of the left controller 3 or the right controller 4, more specifically, when the instruction operation is made while the attitude of the left controller 3 or the right controller 4 is included in the hit determination range. In the exemplary embodiment, even if the instruction operation is made while the attitude of the left controller 3 or the right controller 4 is not included in the hit determination range, the instruction operation is determined to be successful in a case where within the time period for making a check on the still state, the left controller 3 or the right controller 4 is put into the still state while having an attitude included in the hit determination range. In this manner, the conditions for the attitude of the input device required for the success of the instruction operation are alleviated. Therefore, the operation required of the user is allowed to be made easily. For example, in general, an operation of pressing an operation button provided in the controller is one of operations to which users are very accustomed, and the resistance against the operation of pressing the operation button is very small. Therefore, the user may press the button earlier than intended. Such an operation is made before the operation timing intended by the user and may be determined as an invalid operation. This may leave the user dissatisfied. In the exemplary embodiment, even if the operation timing is earlier than intended by the user, such an operation may be determined as being made at the operation timing intended by the user for rescue, depending on the motion of the controller after the operation. This solves the problem that the user is dissatisfied with the determination on the operation.

In the above-described exemplary embodiment, the instruction operation (shoot operation) is made by pressing the ZL button 39 of the left controller 3 or the ZR button 61 of the right controller 4. The instruction operation may be made by pressing another operation button. For example, the instruction operation may be made by pressing the first L button 38 of the left controller 3 or the first R button 60 of the right controller 4. The instruction operation (shoot operation) may be recognized to be made when the first L button 38 of the left controller 3 is pressed in addition to when the ZL button 39 is pressed, and the instruction operation (shoot operation) may be recognized to be made when the first R button 60 of the right controller 4 is pressed in addition to when the ZR button 61 is pressed. In this case, the user may select the operation button to use to make an instruction operation in accordance with which button is easier to press.

The instruction operation may be made by another operation method instead of pressing an operation button. In an example, the instruction operation may be made by an operation of releasing an operation button, by touching the touch panel or a touch pad with, for example, a finger or releasing, for example, a finger from the touch panel or the touch pad. In another example, an operation of increasing the magnitude of acceleration caused in the left controller 3 or the right controller 4 to a threshold level or greater may be made as the instruction operation. For example, an operation of increasing the magnitude of acceleration caused in one of the left controller 3 and the right controller 4 to a threshold level or greater may be made as the instruction operation, and the determination may be made based on the attitude of the other of the left controller 3 and the right controller 4. In this manner, for example, a game of attacking the opponent while preventing the attack of the opponent by use of a sword and a shield may be played.

In the above-described game example, the controller is swung up to put the attitude thereof into the hit determination range. The controller may be swung in another direction.

In a first example of game, an instruction operation is made when the controller is swung down, after being swung up, to put the attitude thereof into a predetermined effective range. In this case, the controller is swung down from the elevation angle side with respect to the effective range. There may be a case where even if the user makes an instruction operation while the positive Z-axis direction of the controller is directed upward with respect to the attitude of the controller included in the effective range in the real space (even if the user makes an instruction operation while the attitude of the controller is included in an elevation angle-side range with respect to the effective range), the instruction operation is determined to have been made in the effective range. More specifically, in a case where the controller is put into the still state or the state equivalent thereto within the still state check time period after the instruction operation is made while the attitude of the controller is included in the elevation angle-side range with respect to the effective range, and the attitude of the controller is included in the effective range in the still state or the state equivalent thereto, the instruction operation is determined to have been made in the effective range.

In a second example of game, an instruction operation is made when the attitude of the controller is put into a predetermined effective range by moving the controller leftward in the yaw direction or in the roll direction. In this case, the controller is moved from the right side with respect to the effective range. There may be a case where even if the user makes an instruction operation while the positive Z-axis direction of the controller is directed rightward with respect to the attitude of the controller included in the effective range in the real space, or while the positive Z-axis direction or the positive Y-axis direction of the controller is inclined rightward in the real space (the attitude of the controller is included in a right-side range with respect to the effective range), the instruction operation is determined to have been made in the effective range. More specifically, in a case where the controller is put into the still state or the state equivalent thereto within the still state check time period after the instruction operation is made while the attitude of the controller is included in the right-side range with respect to the effective range, and the attitude of the controller is included in the effective range in the still state or the state equivalent thereto, the instruction operation is determined to have been made in the effective range.

In a third example of game, an instruction operation is made when the attitude of the controller is put into a predetermined effective range by moving the controller rightward in the yaw direction or in the roll direction. In this case, the controller is moved from the left side with respect to the effective range. There may be a case where even if the user makes an instruction operation while the positive Z-axis direction of the controller is directed leftward with respect to the attitude of the controller included in the effective range in the real space, or while the positive Z-axis direction or the positive Y-axis direction of the controller is inclined leftward in the real space (the attitude of the controller is included in a left-side range with respect to the effective range), the instruction operation is determined to have been made in the effective range. More specifically, in a case where the controller is put into the still state or the state equivalent thereto within the still state check time period after the instruction operation is made while the attitude of the controller is included in the left-side range with respect to the effective range, and the attitude of the controller is included in the effective range in the still state or the state equivalent thereto, the instruction operation is determined to have been made in the effective range.

In a fourth example of game, an instruction operation is made when the position of the controller is in a predetermined effective range by moving the controller forward. In this case, the controller is moved from the side closer to the user than the effective range. There may be a case where even if the user makes an instruction operation at a position closer to the user than the position of the controller included in the effective range in the real space (the position of the controller is included in a close-side range with respect to the effective range), the instruction operation is determined to have been made in the effective range. More specifically, in a case where the controller is put into the still state or the state equivalent thereto within the still state check time period after the instruction operation is made while the position of the controller is included in the close-side range with respect to the effective range, and the position of the controller is included in the effective range in the still state or the state equivalent thereto, the instruction operation is determined to have been made in the effective range.

In a fifth example of game, an instruction operation is made when the position of the controller is in a predetermined effective range by moving the controller rearward. In this case, the controller is moved from the side farther from the user than the effective range. There may be a case where even if the user makes an instruction operation at a position farther from the user than the position of the controller included in the effective range in the real space (the position of the controller is included in a far-side range with respect to the effective range), the instruction operation is determined to have been made in the effective range. More specifically, in a case where the controller is put into the still state or the state equivalent thereto within the still state check time period after the instruction operation is made while the position of the controller is included in the far-side range with respect to the effective range, and the position of the controller is included in the effective range in the still state or the state equivalent thereto, the instruction operation is determined to have been made in the effective range.

In the above-described exemplary embodiment, the method of detecting the motion or the attitude of the left controller 3 or the right controller 4 is merely an example. The motion or the attitude of the left controller 3 or the right controller 4 may be detected by another method or by use of another data. For example, in the above-described exemplary embodiment, the attitude of the left controller 3 or the right controller 4 is calculated only based on the angular velocity caused in the left controller 3 or the right controller 4, or in combination of the angular velocity and the acceleration caused in the left controller 3 or the right controller 4. Alternatively, the attitude of the left controller 3 or the right controller 4 may be calculated only based on the acceleration caused in the left controller 3 or the right controller 4. Even when only the acceleration caused in the left controller 3 or the right controller 4 is detected, the direction in which the gravitational acceleration is caused in the left controller 3 or the right controller 4 may be calculated. As long as the angle of the positive Z-axis direction with respect to the gravitational acceleration direction is calculated each time, substantially the same process as the above-described process may be executed. In the above-described exemplary embodiment, the game image in accordance with the operation made by use of the left controller 3 or the right controller 4 is displayed on the display 12 of the main body apparatus 2. Alternatively, such a game image may be displayed on a stationary monitor via a cradle. In the above-described exemplary embodiment, the left controller 3 and the right controller 4 are used. Alternatively, another controller may be combined with the left controller 3 or the right controller 4, or only such another controller(s) may be used, to execute the game process.

In the above-described exemplary embodiment, a game in which two users shoot bullets from handguns to each other is described. The exemplary embodiment is applicable to another game. For example, the exemplary embodiment is applicable to a bowling game, a basketball game, a shooting game, a game in which a particular action using a sword, a saber or the like is made by a button operation, and the like. In a conceivable shooting game, a position on the display screen that is indicated by the left controller 3 or the right controller 4 is calculated in accordance with the attitude of the left controller 3 or the right controller 4, and when a predetermined operation button is pressed, a bullet flies toward the position. In a case where a virtual object moving on the display screen is the shooting target in such a shooting game, it is conceivable that even if the shooting target is at the shooting position at the time of the shoot operation, the bullet may miss the shooting target because the shooting target moves after the shoot operation. In the exemplary embodiment, in a case where the left controller 3 or the right controller 4 is put into the still state within a predetermined time period so as to indicate the shooting target moving after the shoot operation and/or the vicinity thereof, the track of the bullet may be controlled such that the bullet hits the shooting target. The exemplary embodiment is applicable even to a game played by three or more players. In this case, a determination is made in substantially the same manner as described above on an instruction operation made on the controller operated by each of the players.

The exemplary embodiment of the present application is applied to a game process in the above description. The exemplary embodiment may be applied to an information process other than the game process. For example, in another exemplary embodiment of the present application, a mouse may be used as the operation device. Specifically, a cursor movable on the display screen in accordance with the movement of the mouse may be used to select one of a plurality of alternatives displayed on the display screen. In an example, the cursor is moved by the mouse so as to overlap one alternative, and the mouse is left-clicked to execute an information process of selecting the one alternative. In the another exemplary embodiment of the present application, even if the mouse is left-clicked in a state where the cursor does not overlap any alternative, an information process of selecting one of the alternatives is made possible. More specifically, in a case where the mouse is left-clicked while the cursor is moving and does not overlap any alternative, in a case where the cursor is stopped on one of the alternatives within a predetermined time period after the left-click operation, an information process of selecting the one alternative is executed.

In the another exemplary embodiment of the present application described above, even if the instruction operation (left-click operation) is made in a state where a position parameter controllable on the display screen by moving the mouse is outside a range of one alternative, the one alternative is selected. Alternatively, another operation device may be used. For example, in still another exemplary embodiment of the present application, a pointing device capable of making a remote-pointing operation based on the angular velocity detected by a gyrosensor may be used as the operation device. In this case, even if an instruction operation (pointing operation) is made while the pointing device is at such an attitude as to indicate a position outside a range of a certain item on display, in a case where the pointing device is put into the still state with such an attitude as to indicate a position in the range of the certain item on display within a predetermined time period after the instruction operation, a process of pointing to the certain item on display is executed.

The information processing system 1 may be any apparatus, for example, a mobile game apparatus, a mobile electronic device (a PDA (personal digital assistant), a mobile phone, a personal computer, a camera, a tablet, etc.) or the like.

An example of executing the information process (game process) by the information processing system 1 is described above. Alternatively, at least a part of the above-described processing steps may be executed by another apparatus. For example, in a case where the information processing system 1 is configured to be communicable with another apparatus (e.g., another server, another image display apparatus, another game apparatus, another mobile terminal, etc.), at least a part of the above-described processing steps may be executed by cooperation of the information processing system 1 and the another apparatus. In a case where at least a part of the above-described processing steps is executed by another apparatus as described above, substantially the same processes as the above-described processes may be executed. The above-described information process (game process) may be executed by one processor or by cooperation of a plurality of processors included in an information processing system formed of at least one information processing apparatus. In the exemplary embodiment described above, the CPU 81 of the information processing system 1 may execute a predetermined program to perform the information process. A part of, or the entirety of, the above-described processes may be executed by a dedicated circuit included in the information processing system 1.

In the above-described variations, the exemplary embodiment may be realized by a system form of so-called cloud computing, or a system form of distributed wide area network or local area network. For example, in a system form of distributed local area network, the above-described processes may be executed by cooperation of a stationary information processing apparatus (stationary game apparatus) and a mobile information processing apparatus (mobile game apparatus). In such a system form, there is no particular limitation on which apparatus performs which of the above-described processes. In whichever manner the processes may be divided, the exemplary embodiment is realized.

The orders of processes, the set values, the conditions used for the determinations, and the like that are used in the information processing described above are merely illustrative. The exemplary embodiment is realized also other orders, other values, and other conditions.

The above-described program may be supplied to the information processing system 1 via an external storage medium such as an external memory or the like, or via a wired or wireless communication link. The program may be stored in advance on a non-volatile storage device located in the apparatus. Examples of the information storage medium on which the program may be stored may include CD-ROMs, DVDs, optical disk storage mediums similar thereto, flexible disks, hard disks, magneto-optical disks, magnetic tapes and the like, as well as non-volatile memories. Alternatively, the information storage medium on which the program may be stored may be a volatile memory. Such a storage medium is considered as a computer-readable storage medium. For example, a program stored on such a storage medium may be loaded on, and executed by, a computer or the like, so that various functions described above are provided.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses may be improved and modified in various manners without departing from the spirit and scope of the appended claims. It is understood that the scope of the systems, the methods, the devices, and the apparatuses should be interpreted only by the scope of the appended claims. It is understood that the specific descriptions of the exemplary embodiment enable a person skilled in the art to carry out an equivalent scope thereto on the basis of the descriptions of the exemplary embodiment and general technological knowledge. It should be understood that the descriptions of the components and the like made in the specification in the singular form with the word "a" or "an" preceding the components do not exclude the plurals of the components. It should be understood that, unless otherwise stated, the terms used in the specification are used in their common meanings in the art. Thus, unless otherwise defined, all the jargons and the technical terms used in the specification have the same meanings as those generally understood by a person skilled in the art of the exemplary embodiment. If there is a contradiction, the specification (including definitions) takes precedence.

As described above, the exemplary embodiment is usable as a game system, a game apparatus, a game program, an operation determination method, and an information processing apparatus that allow an instruction operation, made in combination with an attitude and/or a motion of an input device, to be made easily.

What is claimed is:

1. A game system, comprising a computer configured to:
   calculate an attitude of at least one physical, handheld operation device;
   provided that the attitude is included in a first range at a timing when an instruction operation is made using the at least one operation device, make a success determination that the instruction operation is successful;
   make the success determination that the instruction operation is successful even though the attitude is included in a second range outside the first range at the timing the instruction operation is made, provided that, within a predetermined time period after the timing, (a) the attitude is included in the first range or a third range including at least a part of the first range, and (b) the at least one operation device is put into a still state or the at least one operation device moves by no more than a predetermined amount; and
   execute a game process based on a result of the success determination,
   wherein the at least one operation device includes a gyrosensor configured to detect an angular velocity from which the attitude of the at least one operation device is calculated and/or an acceleration sensor configured to detect an acceleration from which the attitude of the at least one operation device is calculated.

2. The game system according to claim 1, wherein provided that the success determination is made even though the attitude is included in the second range outside the first range at the timing the instruction operation is made, the computer is configured to, as the instruction operation, operate a predetermined button included in the at least one operation device.

3. The game system according to claim 1, wherein:
   the at least one physical, handheld operation device comprises a plurality of physical, handheld operation devices;
   the computer is configured to calculate the attitude of each of the operation devices; and
   in the game process, the computer is configured to start a game from a state where the attitude of each of the operation devices is included in a fourth range outside the first range, and then to determine, in making the success determination, which one of the plurality of physical, handheld operation devices made an instruction operation that succeeded at an earliest timing.

4. The game system according to claim 3, wherein for each of the operation devices, in a state where the attitude of the respective operation device is included in the second range or the fourth range, a forward direction of the respective operation device is on a side of a depression angle with respect to the forward direction in a state where the attitude of the respective operation device is included in the first range.

5. The game system according to claim 3, comprising:
the plurality of operation devices; and
a main body apparatus allowing each of the plurality of operation devices to be attached thereto, and detached therefrom;
wherein:
  each of the plurality of operation devices is wirelessly communicable with the main body apparatus;
  the main body apparatus includes a display screen; and
  in the game process, the computer is configured to cause a result of the game process to be displayed on the display screen.

6. A game apparatus configured to execute a game process in connection with at least one physical, handheld operation device, the game apparatus including a computer configured to:
  calculate an attitude of the at least one operation device;
  provided that the attitude is included in a first range at a timing when an instruction operation is made using the at least one operation device, make a success determination that the instruction operation is successful;
  make the success determination that the instruction operation is successful even though the attitude is included in a second range outside the first range at the timing the instruction operation is made, provided that, within a predetermined time period after the timing, (a) the attitude is included in the first range or a third range including at least a part of the first range, and (b) the at least one operation device is put into a still state or the at least one operation device moves by no more than a predetermined amount; and
  execute the game process based on a result of the success determination,
  wherein the at least one operation device includes a gyrosensor configured to detect an angular velocity from which the attitude of the at least one operation device is calculated and/or an acceleration sensor configured to detect an acceleration from which the attitude of the at least one operation device is calculated.

7. A non-transitory computer-readable storage medium having stored thereon a game program executable by a computer included in a game apparatus, the game program causing the computer to execute functionality comprising:
  calculating an attitude of at least one physical, handheld operation device;
  provided that the attitude is included in a first range at a timing when an instruction operation using the at least one operation device, making a success determination that the instruction operation is successful;
  making the success determination that the instruction operation is successful even though the attitude is included in a second range outside the first range at the timing the instruction operation is made, provided that, within a predetermined time period after the timing, (a) the attitude is included in the first range or a third range including at least a part of the first range, and (b) the at least one operation device is put into a still state or the at least one operation device moves by no more than a predetermined amount; and
  executing a game process based on a result of the success determination,
  wherein the at least one operation device includes a gyrosensor configured to detect an angular velocity from which the attitude of the at least one operation device is calculated and/or an acceleration sensor configured to detect an acceleration from which the attitude of the at least one operation device is calculated.

8. The non-transitory computer-readable storage medium having the game program stored thereon according to claim 7, wherein making the success determination that the instruction operation is successful includes, as the instruction operation, operating a predetermined button included in the at least one operation device.

9. The non-transitory computer-readable storage medium having the game program stored thereon according to claim 7, wherein:
  the at least one physical, handheld operation device comprises a plurality of physical, handheld operation devices;
  the attitude of each of the operation devices is calculated; and
  executing the game process includes starting a game from a state where the attitude of each of the operation devices is included in a fourth range outside the first range, and then determining, in making the success determination, which one of the plurality of physical, handheld operation devices made an instruction operation that succeeded at an earliest timing.

10. The non-transitory computer-readable storage medium having the game program stored thereon according to claim 9, wherein for each of the operation devices, in a state where the attitude of the respective operation device is included in the second range or the fourth range, a forward direction of the respective operation device is on a side of a depression angle with respect to the forward direction in a state where the attitude of the respective operation device is included in the first range.

11. An operation determination method for use with at least one physical, handheld operation device, the operation determination method comprising:
  calculating an attitude of the at least one operation device;
  provided that the attitude is included in a first range at a timing when an instruction operation is made using the at least one operation device, making a success determination that the instruction operation is successful; and
  making the success determination that the instruction operation is successful even though the attitude is included in a second range outside the first range at the timing the instruction operation is made, provided that, within a predetermined time period after the timing, (a) the attitude is included in the first range or a third range including at least a part of the first range, and (b) the at least one operation device is put into a still state or the at least one operation device moves by no more than a predetermined amount,
  wherein the at least one operation device includes a gyrosensor configured to detect an angular velocity from which the attitude of the at least one operation device is calculated and/or an acceleration sensor configured to detect an acceleration from which the attitude of the at least one operation device is calculated.

12. An information processing apparatus configured to perform an information process in connection with at least one physical, handheld operation device, the information processing apparatus comprising a computer configured to:
  calculate a parameter controllable by moving the at least one operation device;

provided that the parameter is included in a first range at a timing when an instruction operation is made using the at least one operation device, execute the information process based on the first range; and execute the information process based on the first range, even though the parameter is included in a second range outside the first range at the timing the instruction operation is made, provided that, within a predetermined time period after the timing, (a) the parameter is included in the first range or a third range including at least a part of the first range, and (b) the at least one operation device is put into a still state or the at least one operation device moves by no more than a predetermined amount, wherein the at least one operation device includes a gyrosensor configured to detect an angular velocity from which the parameter is calculated and/or an acceleration sensor configured to detect an acceleration from which the parameter is calculated.

13. The operation determination method according to claim 11, further comprising executing a game process based on a result of the success determination.

14. The operation determination method according to claim 13, wherein:

the at least one physical, handheld operation device comprises a plurality of physical, handheld operation devices; and the attitude of each of the operation devices is calculated, and further comprising:

in executing the game process, starting a game from a state where the attitude of each of the operation devices is included in a fourth range outside the first range, and then determining, in making the success determination, which one of the plurality of physical, handheld operation devices made an instruction operation that succeeded at an earliest timing.

15. The information processing apparatus according to claim 12, wherein the at least one operation device is removably connectable to the information processing apparatus.

16. The information processing apparatus according to claim 12, wherein:

the at least one physical, handheld operation device comprises a plurality of physical, handheld operation devices;

the parameter is calculated for each of the operation devices; and the information processing apparatus includes starting a game from a state where the parameter of each of the operation devices is included in a fourth range outside the first range and, then, in making the success determination, a determination is made as to which one of the plurality of physical, handheld operation devices made an instruction operation that succeeded at an earliest timing.

* * * * *